United States Patent
Mizrachi et al.

(10) Patent No.: US 8,245,142 B2
(45) Date of Patent: Aug. 14, 2012

(54) METHOD AND SYSTEM FOR DISPLAYING DATA ON A MOBILE TERMINAL

(75) Inventors: Joseph Mizrachi, Carnegie (AU); Barak Mizrachi, Carnegie (AU)

(73) Assignee: Ozmiz Pty. Ltd., Carnegie, VIC (AU)

( * ) Notice: Subject to any disclaimer, the term of this patent is extended or adjusted under 35 U.S.C. 154(b) by 1093 days.

(21) Appl. No.: 12/097,805

(22) PCT Filed: Dec. 28, 2006

(86) PCT No.: PCT/AU2006/001995
§ 371 (c)(1),
(2), (4) Date: Jun. 17, 2008

(87) PCT Pub. No.: WO2007/073584
PCT Pub. Date: Jul. 5, 2007

(65) Prior Publication Data
US 2008/0320396 A1    Dec. 25, 2008

Related U.S. Application Data

(60) Provisional application No. 60/774,181, filed on Feb. 16, 2006, provisional application No. 60/793,175, filed on Apr. 19, 2006.

(30) Foreign Application Priority Data

Dec. 29, 2005   (AU) ................................ 2005907357
Mar. 17, 2006   (AU) ................................ 2006100200

(51) Int. Cl.
*G06F 3/00*         (2006.01)

(52) U.S. Cl. ...................................................... 715/744
(58) Field of Classification Search .................. 715/744, 715/746, 846, 864, 784, 785, 786
See application file for complete search history.

(56) References Cited

U.S. PATENT DOCUMENTS

| | | | |
|---|---|---|---|
| 6,300,947 B1 * | 10/2001 | Kanevsky | ..................... 715/866 |
| 6,337,697 B1 * | 1/2002 | Kim | ............................. 715/784 |
| 2002/0061771 A1 | 5/2002 | Hwang et al. | |
| 2002/0161578 A1 * | 10/2002 | Saindon et al. | ............... 704/235 |
| 2002/0171691 A1 | 11/2002 | Currans et al. | |
| 2003/0184591 A1 | 10/2003 | Youn et al. | |

(Continued)

FOREIGN PATENT DOCUMENTS

| | | |
|---|---|---|
| WO | 2005/015910 | 2/2005 |
| WO | 2005/017872 | 2/2005 |

OTHER PUBLICATIONS

International Search Report: PCT/AU2006/001995. International Search Report; PCT/AU2006/001995.

*Primary Examiner* — Thanh Vu
(74) *Attorney, Agent, or Firm* — Ladas & Parry LLP

(57) ABSTRACT

The present invention provides a method and system for acquiring, storing and displaying content on a mobile terminal. The mobile terminal is adapted to acquire content from content providing devices or sources such as the Internet, e-mail, or direct download from a PC to the mobile terminal for display. Content providing devices of the system are stand-alone devices which store content, such as location based advertising information, for downloading by a mobile terminal in close proximity to the content providing device. An application resident on the mobile terminal can provide scrolling player functionality to enable stored data content to be easily viewed.

21 Claims, 16 Drawing Sheets

U.S. PATENT DOCUMENTS

| | | |
|---|---|---|
| 2004/0131043 A1 | 7/2004 | Keller |
| 2004/0250220 A1 | 12/2004 | Kalenius |
| 2004/0255244 A1* | 12/2004 | Filner et al. .................. 715/517 |
| 2005/0021851 A1 | 1/2005 | Hamynen |
| 2005/0039136 A1* | 2/2005 | Othmer ........................ 715/774 |
| 2005/0143136 A1 | 6/2005 | Lev et al. |
| 2005/0159141 A1 | 7/2005 | Osborn, Jr. |
| 2006/0268100 A1 | 11/2006 | Karukka et al. |

* cited by examiner

METHOD AND SYSTEM FOR DISPLAYING DATA ON A MOBILE TERMINAL

FIELD OF THE INVENTION

The invention relates to displaying data on a mobile terminal such as a mobile phone or personal digital assistant (PDA). An example of an application of the invention is displaying information from advertising or information services on a mobile phone, storing the information, and then displaying the information on a display of the mobile phone.

BACKGROUND OF THE INVENTION

Mobile terminals such as mobile phones and personal digital assistants (PDAs) have become items regularly carried by people. These devices are commonly used as replacements for manual pocketbooks or diaries, we use them to keep track of phone numbers and to keep or send notes to others using messaging services. However the small size of mobile terminals generally means these are less powerful processing devices that desktop or portable computers. Mobile terminals also generally have small screens and the user input interface is limited to either a keypad or very small keyboard which is often awkward to use. Due to these limitations is generally more awkward to download and read information on a mobile terminal than on a typical personal computer.

There is a need for a system which enables simple viewing and/or downloading of content for mobile terminals.

SUMMARY OF THE INVENTION

According to one aspect of the present invention there is provided a method for providing and displaying content on a mobile terminal with a display, the method comprising the steps of:
  acquiring a content data stream by a mobile terminal;
  formatting the content data stream acquired by the mobile terminal according to predetermined parameters including one or more of: parameters based on display limitations for the mobile terminal, and user specified parameters; and
  displaying the formatted content on the display.

According to another aspect of the present invention there is provided an application adapted to be resident on a mobile terminal with a display to convert the mobile terminal from any intended use into a graphic display player, whereby the graphic display player automatically displays data content on the display in a scrolling mode, and provides control features to enable a user to control at least one or more of the scrolling rate, scroll direction and font size during data display.

According to another aspect of the present invention there is provided a system for providing and displaying content on a display of a mobile terminal, the system comprising:
  a content acquisition interface adapted to enable a mobile terminal to acquire a content data stream from one or more content providers;
  a formatting component adapted to format the acquired content data stream according to one or more predetermined parameters including: parameters based on display limitations for the mobile terminal, and user specified parameters; and
  a display component adapted to display the formatted content on the display.

According to another aspect of the present invention there is provided a content providing device comprising:

a communication interface adapted to communicate with a content acquisition interface of a mobile terminal with a display, said mobile terminal being required to be located proximate the content providing device;
  a storage component for storing content data for downloading as one or more content data streams; and
  a controller, whereby the device is adapted to enable acquisition of one or more content data streams on request by a mobile terminal located proximate the device.

DETAILED DESCRIPTION

Figure 1:
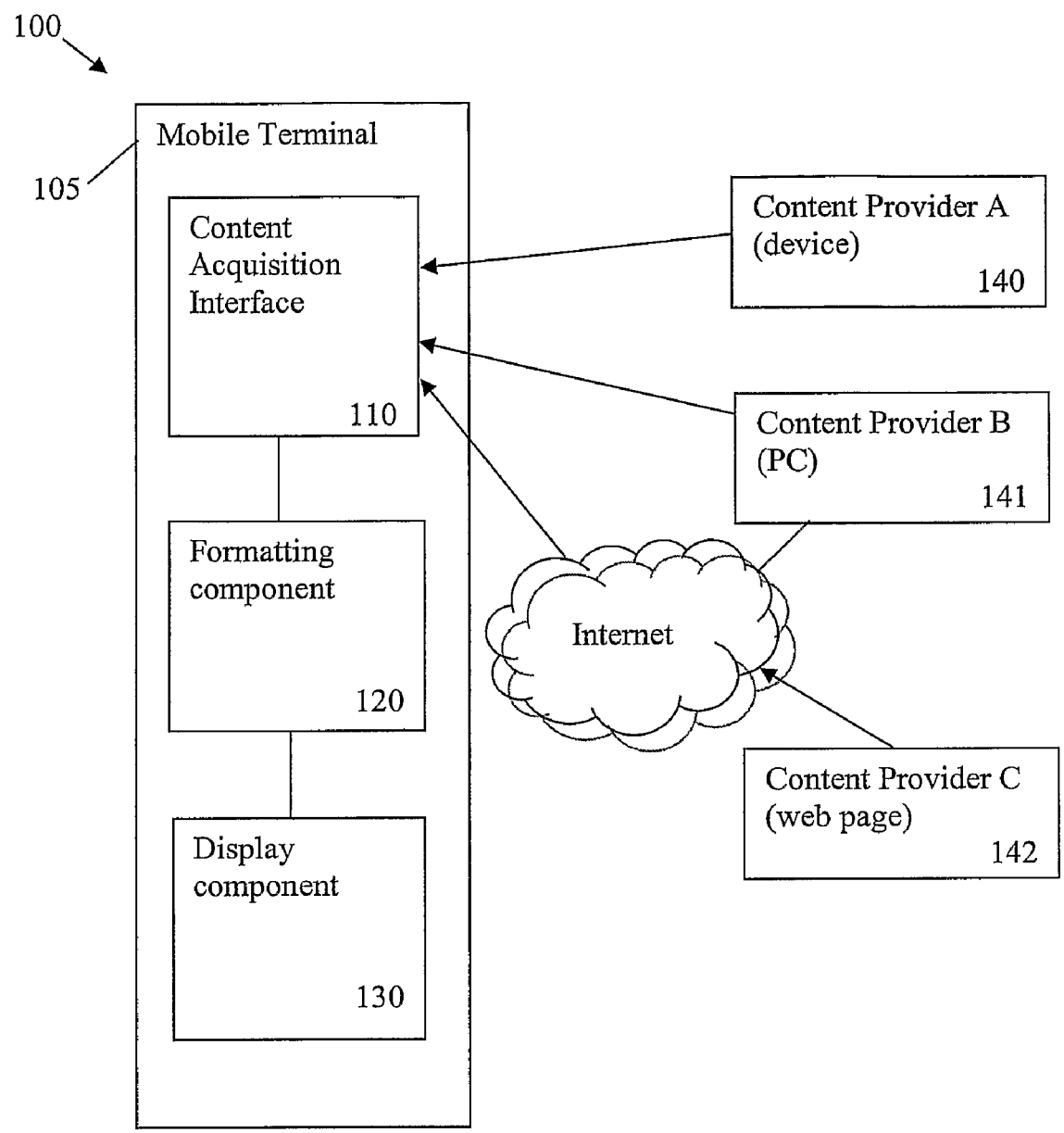
FIG. 1 is a block diagram of an embodiment of a system of the present invention for a mobile phone.

A system according to embodiments of the present invention enables content to be provided to, stored and then displayed on a mobile terminal 105. The system 100 comprises a content acquisition interface 110, a formatting component 120 and a display 130.

The content acquisition interface 110 is adapted to enable the mobile terminal 105 to acquire a content data stream from one or more content providers 140, 141 and 142. For example, the content providers could include a dedicated device 140 adapted to transmit content data directly to the mobile 105, a personal computer 141 adapted to transfer content data files to the mobile phone, or an Internet site 142 which can be accessed from the mobile phone via a telecommunication network to acquire content data, data may also be acquired via e-mail capability provided in the mobile terminal. The content data stream may be displayed as it is acquired or stored on the mobile phone for later display.

The formatting component 120 is adapted to format the acquired content data stream according to one or more predetermined parameters. The parameters include parameters based on the limitations of the device display limitations for the mobile terminal 105, and user specified parameters. For example, parameters based on the device display capabilities can include: parameters based on screen resolution, colour display capability, image display capability, screen size, screen refresh rate, display buffer size and the like. Examples of user specified parameters include: font size, font type, scroll rate, scrolling direction, colour mode etc. The formatted data is then displayed by the display component 130. The display component typically includes a screen, however the display component may also include features such audio output, tactile output such as vibration, or other visual outputs such as visual projection or lights.

The mobile terminal can be a mobile phone, personal digital assistant (PDA), portable computer, media player or the like. A mobile terminal can also be a content provider as well as a content acquirer, for example where terminal to terminal data sharing or transfer is possible.

Figure 12:
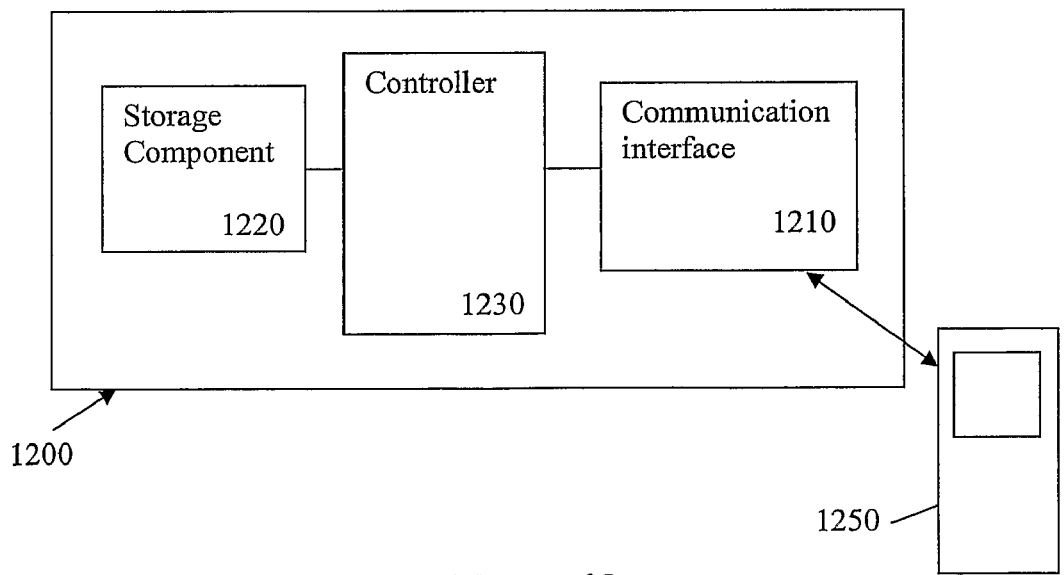
FIG. 12 is a block diagram of an embodiment of content providing device in communication with a mobile terminal.

The system can also include one or more content providers. An example of a content providing device is illustrated in FIG. 12, the content providing device 1200 comprises: a communication interface 1210, a storage component 1220, and a controller 1230. The communication interface 1210 is adapted to communicate with a content acquisition interface of a mobile terminal 1250 located proximate the content providing device 1200. The storage component 1220 is for storing content data for downloading to the mobile terminal 1250 as one or more content data streams. The controller 1230 controls the processes for communication between the content providing device 1200 and the mobile terminal 1250 and downloading of stored content data to the mobile terminal 1250.

In an embodiment the communication interface 1210 is implemented using a limited range wireless communication technology. In the example described herein Bluetooth is used however other radio frequency wireless interfaces such as WiFi, 802.11X, WLAN, RFID or the like can be used, alternatively optical interfaces such as infra red (IR) can also be used and all alternatives are considered within the scope of the invention and encompassed in the claims.

The communication interface 1210 of a preferred embodiment is adapted to respond to a request to download content sent by a wireless device with compatible wireless communication functionality within transmission range. In this embodiment the availability of content for download is advertised at the location, for example on an advertising board, and a user requests the content download by pressing a predetermined key on their mobile terminal. The content providing device controller 1230 and communication interface 1210 then establish communication with the mobile terminal 1250 and automatically download the content.

Alternatively the communication interface 1210 can automatically detect wireless devices with compatible wireless communication functionality enabled within transmission range. The content providing device controller 1230 and communication interface 1210 establish communication with the mobile terminal 1256 and offer to transfer content to the mobile terminal, and the mobile terminal displays the offer to the user, offers for content form more than one content provider may be displayed and browsed by the user on the mobile terminal. The user accepts an offer using a single key stroke which triggers the mobile terminal to request content be transmitted by the content providing device as one or more content data streams. The mobile terminal then receives and stores and/or displays each content data stream according to user preferences.

An example of an application for such a content providing device is an advertising device which enables a location such as an advertising board to transmit the advertising information to a mobile terminal upon request. In this embodiment the content providing device is a stand-alone device which is small, cheap, stores a limited number of content data streams (advertisements) and is only enabled for short range wireless communication.

The stand-alone content providing device stores advertising information such as the details of a house or car for sale. The device can receive and store information received wirelessly, as well as transferring the information upon request wirelessly. The device is adapted to be placed and attached to any item that requires advertising, such as an advertising board, (e.g., retail, real estate) a car for sale, etc. It communicates with a mobile terminal using wireless communication such as Bluetooth. Upon user request, it will transfer the advertising details regarding the item for sale including contacts, references, description, cost, etc. The interface between the content providing device and the mobile terminal can be implemented such that the advertising information can be transferred and stored on the mobile terminal in response to a single key stroke by the user.

Embodiments of the content providing device can be implemented in a number of ways. For example, the content providing device may be implemented as a specially designed and built device, in a mobile terminal which acts as a content providing device by running software which stores and transmits the content data to another mobile terminal; or in a PC that acts as a content providing device and is adapted to communicate with and transmit content to a mobile terminal.

Figure 13:
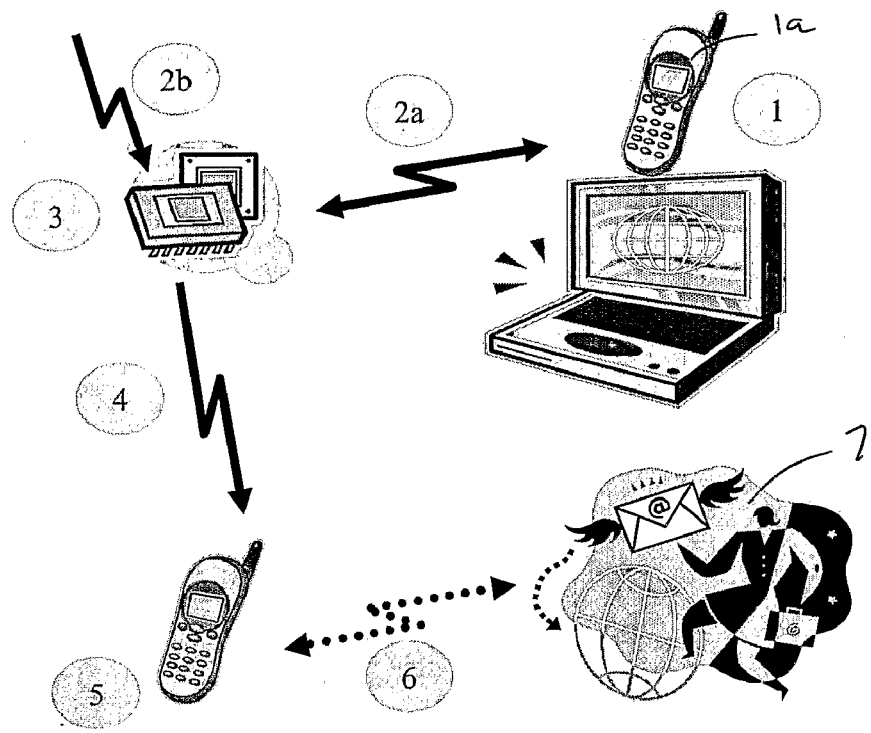
FIG. 13 illustrates a system according to an embodiment of the present invention.

An example of a way content data is prepared and stored on a content providing device will now be described in greater detail with reference to FIGS. 13 and 14. In the embodiment of FIG. 13, the content to be stored on the content providing device 3 is prepared on another device such as a PC 1 or mobile terminal 1*a*. The content is prepared using in a XML or text format according to a structured template in this embodiment to minimise any further formatting that may be required for displaying the content data on a mobile terminal. The content may also be downloaded from another source, such as a web site or document file, and edited or formatted according to the structured template, for example using a specialised software application on the PC. The content can include text and images, for example where the content is an advertisement the content may contain both descriptions and pictures of the goods for sale. Some examples of the format for such content are provided in tables 1 to 4 where table 1 shows generic information common to most advertising scenarios and tables 2 to 4 give examples of additional information tailored for the particular advertising scenario that can accompany the generic definition.

TABLE 1

Generic Definition

| Category Header | Message type | e.g. HOUSE, CAR, ITEM, etc. |
|---|---|---|
| Contact Details | Source | |
| | Time stamp | |
| | Images count | |
| | Sound clips count | |
| | Video clips count | |
| | Name | |
| | Agency name | |
| | Phone | |
| | Address | |
| Inspections | Days | |
| | Times | |
| Description | Free text description | |
| Image | Image 1 | |
| | Image X | |
| Sound clips | Sound clip 1 | |
| | Sound clip Y | |
| Video clips | Video clip 1 | |
| | Video clip Z | |
| Location | Address | |

TABLE 2

Item definition

| Item | Name |
|---|---|
| | Cost |
| | Style |
| | Stock |
| | Action |
| | Shop |

TABLE 3

House Definition

| House | Bedrooms |
|---|---|
| | Bathrooms |
| | Study |
| | Size |
| | Style |
| | Garage |

TABLE 4

Car Definition

| Car | Make & Model |
|---|---|
| | Year |
| | Miles/Kilometres |
| | Colour |
| | Style |
| | Doors |

Once the content is prepared the content data stream is transmitted to the content providing device 3 for storage thereon either by direct wired or wireless communication 2a between the PC 1 or mobile terminal 1a and the device 3, or using wireless communication established between the PC 1 or mobile terminal 1a and the device 3 via a telecommunication network, for example via the Internet and satellite communication to the device 3. The device 3 stores the content data stream and is ready to provide this content to a mobile terminal 4.

Figure 14:
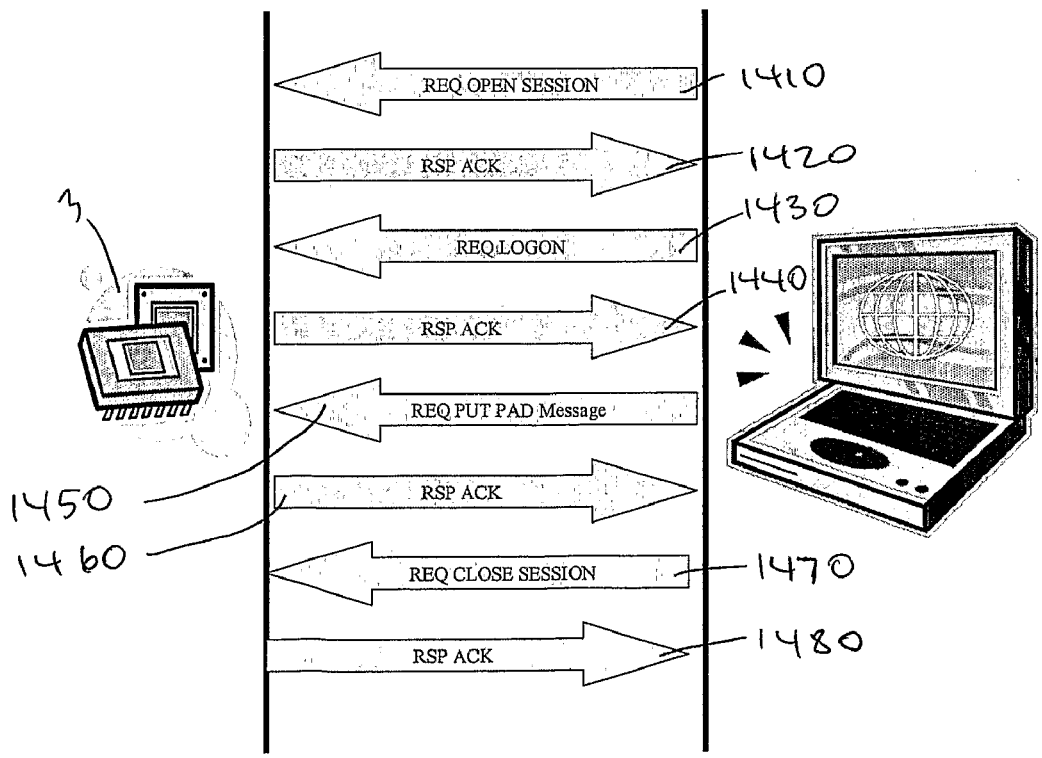
FIG. 14 is an example of a communication flow for storing data on a content providing device according to an embodiment of the present invention.

FIG. 14 illustrates am example of the signalling sequence between a PC 1 and a content providing device 3 for downloading the content data stream. Once the content data is prepared the PC 1 sends an open session request signal 1410 to the content providing device 3 to start the download sequence. The device 3 responds with an acknowledgement signal 1420 to confirm that communication is established between the PC 1 and the device 3. The PC 1 then sends a logon signal 1430 to establish that the PC 1 is authorised to download content to the device 3. Once the device 3 has confirmed that the PC 1 is an authorised content source, device 3 responds which an acknowledgement signal 1440. The PC 1 then transmits the content data stream 1450 to the device 3. The device 3 acknowledges successful reception of the content data stream using acknowledgement signal 1460. If there is no further content to download the PC 1 sends a signal 1470 to close the communication session. The device 3 sends acknowledgement 1480 to the PC 1 and closes the session.

Figure 15:
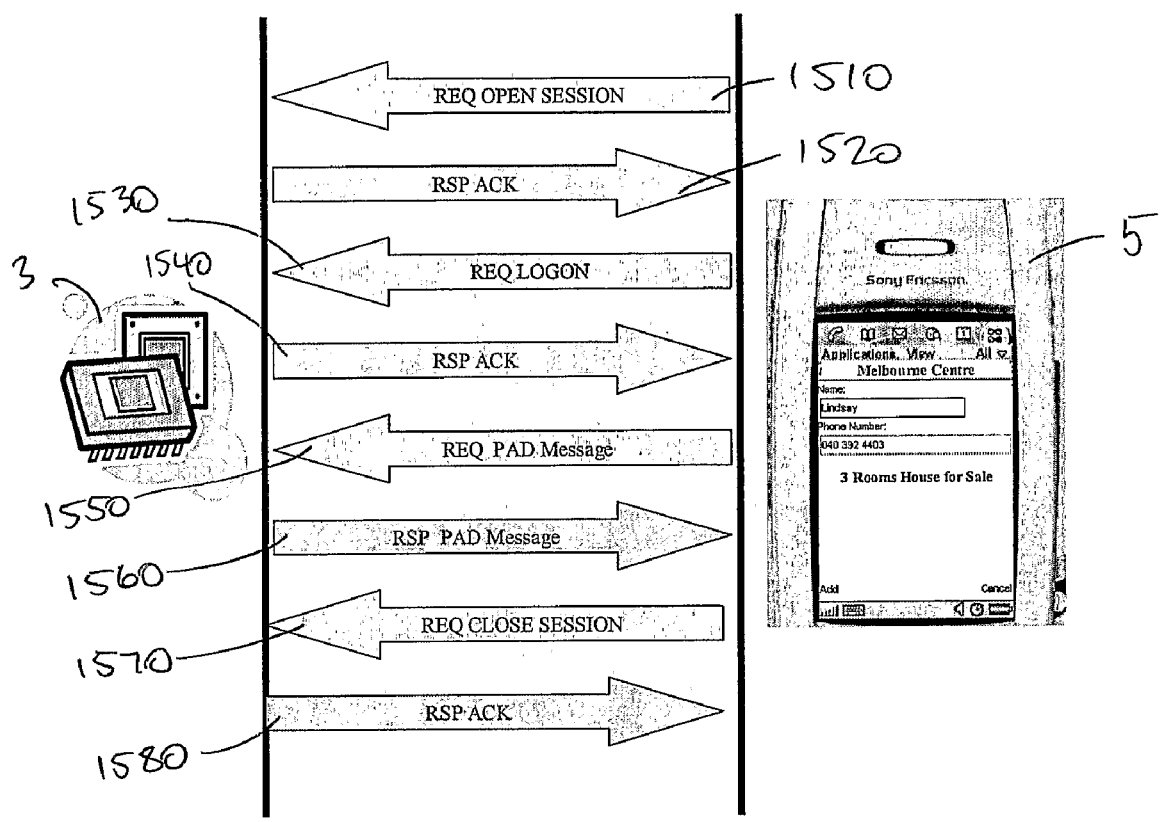
FIG. 15 is an example of a communication flow for a mobile terminal acquiring content from a content providing device according to an embodiment of the present invention.
Figure 18:
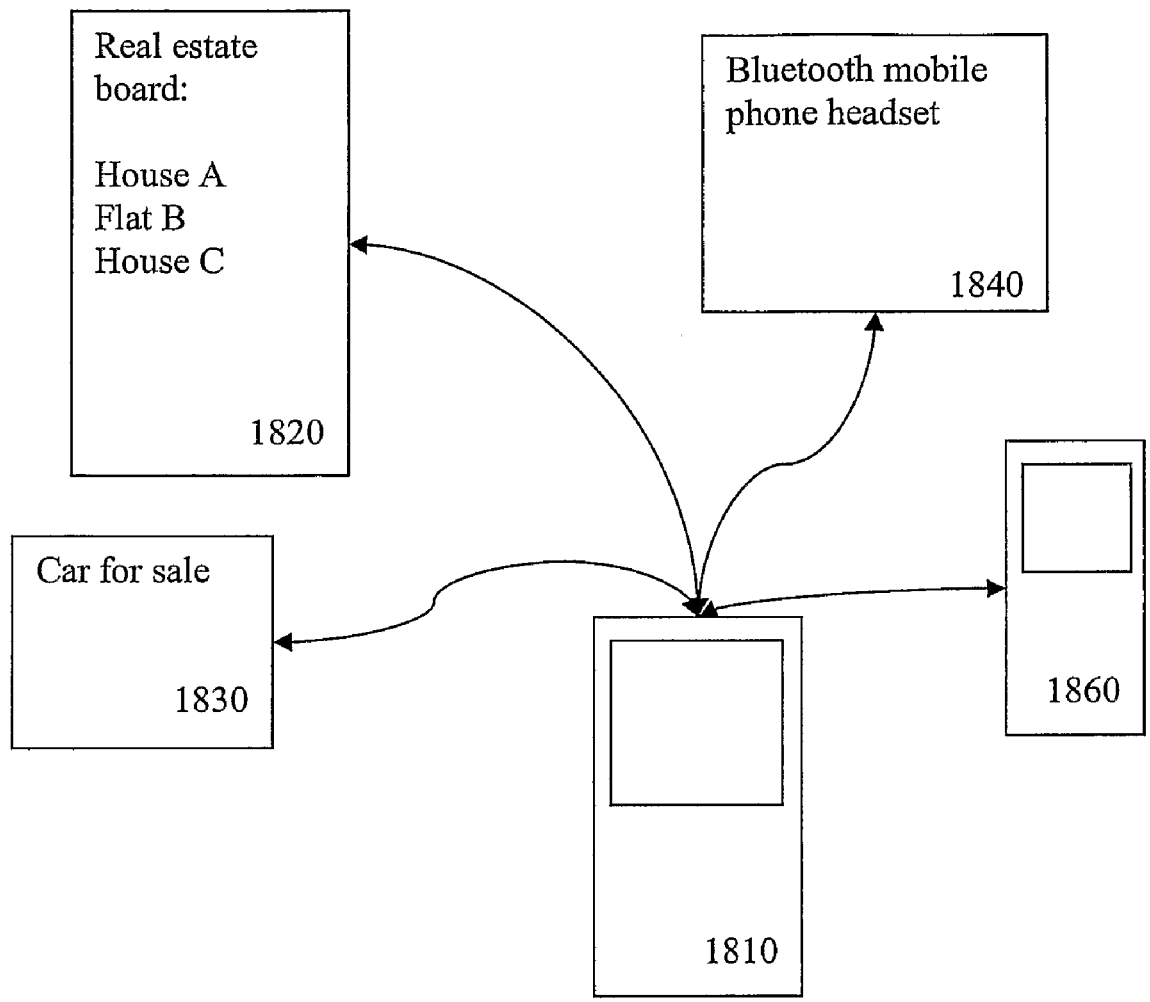
FIG. 18 is illustrates an example of a mobile terminal within wireless communication range of a number of other devices.
Figure 19:
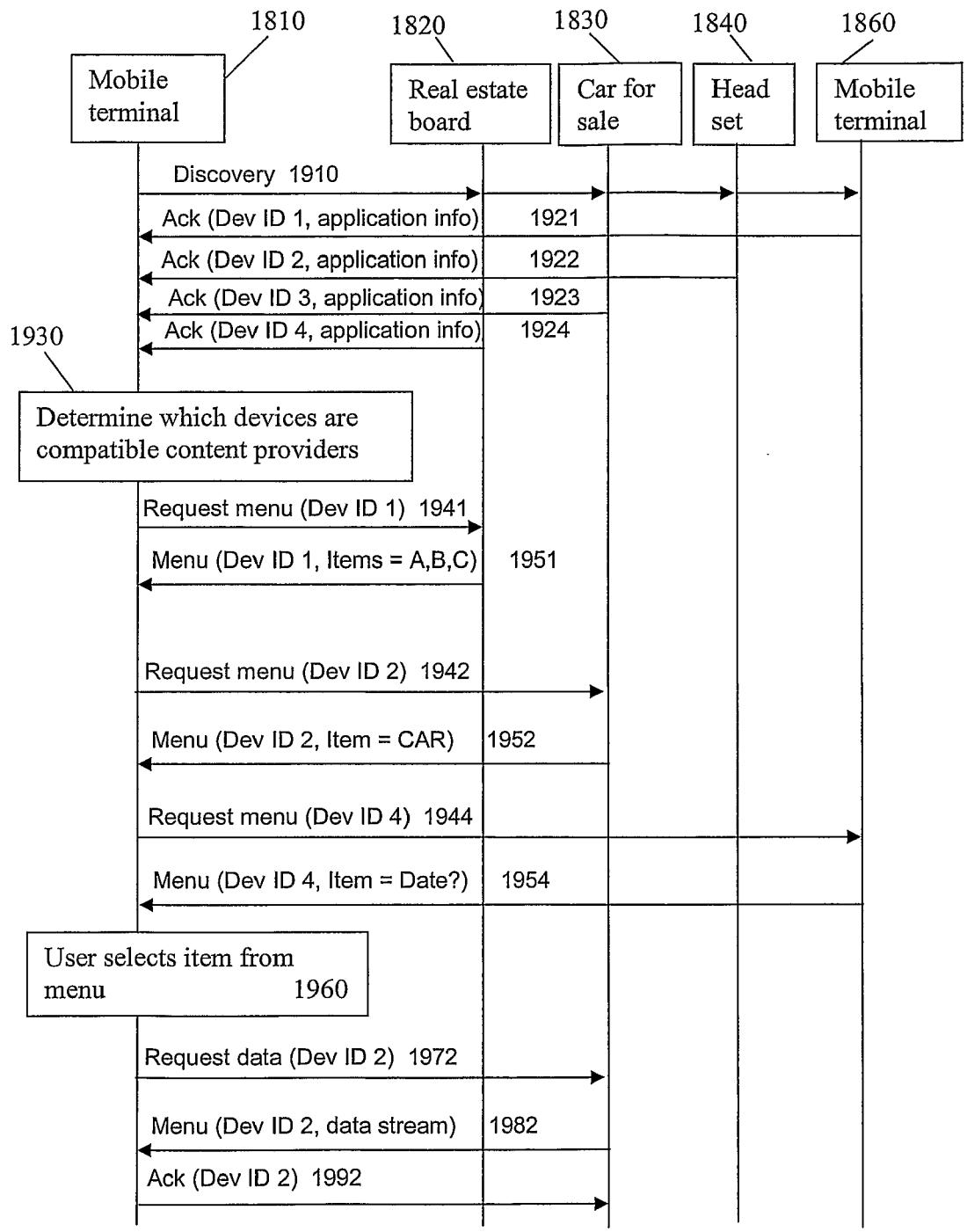
FIG. 19 is an example of a signal flow for the mobile terminal of FIG. 18 downloading content from a content providing device using wireless communication.

The signalling 4 for downloading content from a content providing device 3 to a mobile terminal 5 will now be described with reference to FIG. 15. In this embodiment a mobile terminal 5 sends a request signal 1510 to establish communication between the mobile terminal 5 and the device 3 which is confirmed by the device using an acknowledgment signal 1520. Then mobile terminal 5 then sends a logon request 1530 to confirm the mobile 5 is authorised to download content from the device 3, this signal can also include information indicating which content was selected where more than one content download option is available, this is confirmed using an acknowledgement signal 1540. The mobile 5 then sends a request signal 1550 to initiate downloading of the content data stream 1560. Once the content data stream is downloaded the mobile 5 send signal 1570 to close the communication session. The device 3 sends an acknowledgement 1580 and closes the session. Thus the downloading of content data is handled by the communication between the device 3 and the mobile terminal 5 and the only user interaction is the keystroke to initiate the communication and download. This is applicable where there is only one content data option.

Where there are multiple content providing devices within range of the mobile terminal or multiple content download options from one or more devices available content sources and content are displayed, for example in a list sorted by content provide or category, for the user to browse and select the desired content. An example of the signalling between a mobile terminal and plurality of content providing devices will now be described with reference to FIGS. 18 and 19. FIG. 18 illustrates a scenario where a user's mobile terminal 1810 is in wireless (Bluetooth) communication range with: a real estate agent board 1820 enabled with a content providing device; a content providing device on a car for sale 1830; a Bluetooth mobile headset 1840; and a mobile phone 1860. The user may be interested in the car for sale and notices a sign on the car advertising there is further information available for download using the content acquisition and display functionality to the user's mobile terminal. The user presses the "get" key to trigger the application to acquire the data. The acquisition component of the application first sends a discovery signal 1910 to determine what devices are within range and have a compatible communication interface, for example the Bluetooth discovery. The devices 1820, 1830, 1840, 1860 all receive the discovery signal 1910 and each responds with an acknowledgement signal 1921-4 which includes a device identifier, device name, and information regarding the device application. The devices which are compatible with the content acquisition application of the mobile terminal 1810 can be determined 1930 from the content of this signal for example by an application identifier common to all devices enabled for this application. Similarly the application on the mobile terminal identifies that the Bluetooth headset 1840 is not a running the application and ceases to communicate further with the headset 1840 which will return to a standby mode and close any communication session when no further communication from the terminal 1810 is received.

The real estate board 1820, car for sale 1830 and mobile phone 1860 are all identified as compatible content providing devices 1930. The mobile terminal 1810 then sends request signal 1941, 1942, 1944 to these devices using the device identifiers.

The real estate board 1820 received the request signal 1941 and responds with content header information for a number of items for which data can be downloaded, for example House A, Flat B and House C, this content header for each item can define the item category (House) the content item identifier in the Advertising board device (A) and any other information deemed of value for displaying on the mobile terminal menu such as the address. This content header is used by the application running on the mobile terminal both for display on the mobile terminal menu for content selection and also for any subsequent content download request signalling. Similarly request signal 1942 is sent to the car for sale 1830 which replies with the acknowledgement signal 1952 including the content header for the car, and the mobile phone 1860 responds to the request signal 1944 with the acknowledgement signal 1954 including a header for a content item which advertises the mobile phones user as being available for dating.

The information from the content headers is used to display a list of content items available for download on the mobile terminal 1810. These content items may be grouped by device, such as:

Device 1:
   House: 1 Smith St, Elwood
   Flat: 20/5 Bruce Rd, Elwood
   House: 12 Bruce Rd, Elwood
Device 2:
   Car 1995 Toyota Camry, Red
Device 3:
   Available for dating, F 35
Alternatively the items can be listed by category, such as:
Dating:
   Available for dating, F 35
Motor Vehicles:
   Car 1995 Toyota Camry, Red
Real estate:
   Flat: 20/5 Bruce Rd, Elwood
   House: 1 Smith St, Elwood
   House: 12 Bruce Rd, Elwood The lists may be formatted according to a user's preferences (set as user parameters in the mobile terminal). The user's preferences could also include one ore more preferred categories, for example to ensure Houses are listed first, or categories to exclude such as dating offers if the user is not interested in this content.

This list is redundant if only one compatible device is found and only one content item is available for download, in this situation the mobile terminal 1810 will automatically request the available data without requiring further user input, thus enabling the acquisition of data using only one key stroke. Similarly if user preferences are set to exclude various categories of data and only one desired content item is available or a preference is set to always download all available data in a particular category, the application can automatically download the desired content data without requiring further user input.

Listing the available content enables the user to view the available content and select one or more content data streams from one or more content providing devices for downloading. For example the user may select single items by manually scrolling to the item on the list and pressing a "get" key or select all items from a device or category by selecting the category or device heading in the menu. Once the user has selected the desired content using the displayed list 1960 the application generates a request data message 1972 using the device identifier and content identifier associated with the selected item. The content data stream will automatically be downloaded 1982 to the mobile terminal. Once the content is downloaded the mobile terminal acknowledges 1992 the receipt of the data to close the communication session.

Devices, such as the mobile phone 1860 and Real estate board 1820, will automatically time-out and close any communication session if no data request message is received.

The downloaded content can be automatically displayed on the mobile terminal, stored on the mobile terminal, forwarded to another device such as a web site or PC via the Internet or e-mailed to another user or all of the above. The content can also be discarded, by deleting the data stream from the mobile terminal memory, once it has been displayed, this may be done automatically after display according to a user preference, or in response to a discard command given by the user.

Figure 20:
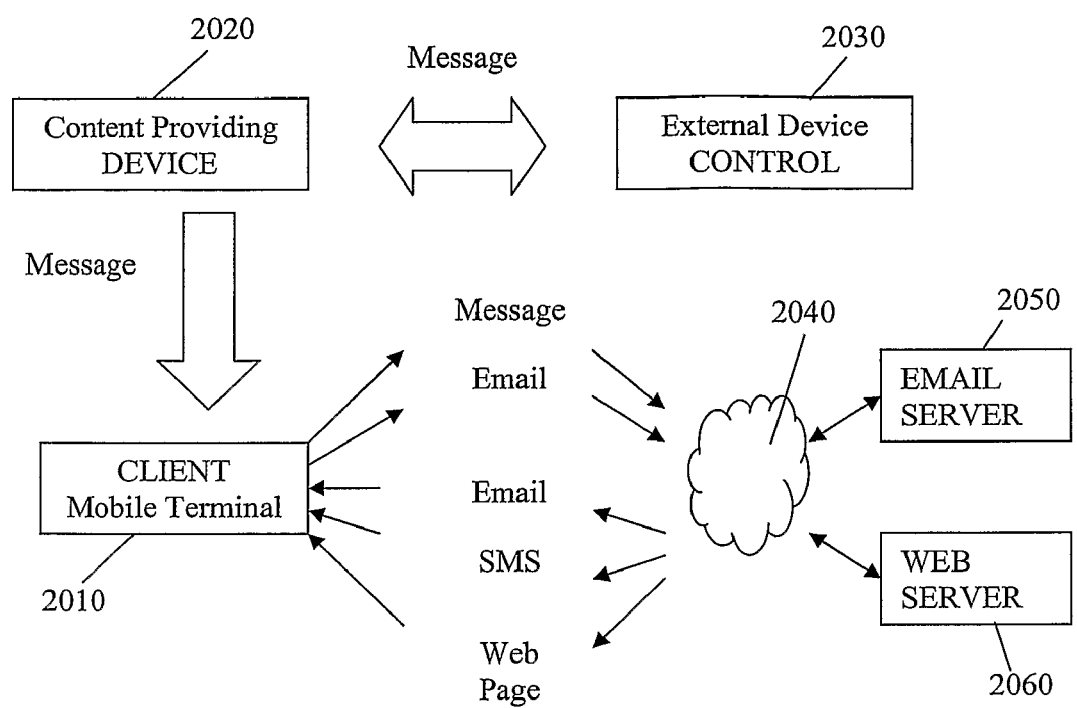
FIG. 20 illustrates a system according to an embodiment of the present invention.

FIG. 20 is an example of a system incorporating a dedicated stand-alone content providing device 2020, an external control device 2030 for preparing and downloading content data to the content providing device 2020, and a mobile terminal 2010 enabled with the above data acquisition and display application. By providing the external device control 2030 for preparing and wirelessly downloading content data to the stand-alone content providing device 2020, this device 2020 does not need to have user interface functionality such as manual data input and display functionality. This enables the content providing device size and functionality to be minimised in order to produce a simple, cheap, robust, and small content providing device. For example, the device 2020 may be a single microchip with a Bluetooth interface, memory and processing capability. The device may be connectable to a power supply of have an on-board power supply such as a battery or photovoltaic cell. The device is registerable to ensure only an authorised user (i.e. the external control 2030) is able to store content to the device 2020, however the device 2020 is open for any compatible device to download content from the device. For example, each device 2020 may be provided with a unique identifier, on registration of the device 2020 with an external control, a password or key is exchanged between the external control 2030 and content providing device 2020 which is subsequently used for authenticating a device attempting to download data to the content providing device 2020, without the authentication key the device 2020 will prohibit downloading of data to the device 2020.

The data content, for example the advertising data for the real estate board, is prepared on an external device 2030, and transmitted to the content providing device 2020. The mobile terminal 2010 can acquire content from the device 2020, as described above, but is not able to write data to the device 2020 as it is not authorised or registered to do so. The mobile terminal 2010 is also enabled to acquire data such as e-mails, web pages and SMS messages from sources such as an e-mail server 2050 or web server 2060 via the telecommunication network and the Internet 2040. The mobile terminal can also send data, such as data downloaded from the content providing device, to other users via messaging or e-mail. Where content data downloaded from the content providing device includes links to Internet web pages the user can follow this link to view the web page on their mobile terminal, similarly the content may include an e-mail address for enquires to which the user can send a message directly using their mobile terminal.

Advantages of this embodiment of the content providing device include:

- direct "A2C" ("Advertiser to Consumer") dialogue and identifying the location ("hot spot") as an area where the advertising information can be downloaded;
- the user initiates the request for the advertising information (positive advertising). The concept is based on P2P advertising (i.e. "person to person" or "point to point" dialogue); and
- transferring of advertising information from the advertiser to the user's mobile terminal as digital data, is fully automated and can be established by a single keystroke, thus is simple and convenient for the user.

The key stroke to accept the content may be a pre-programmed or default key, such as "#" to request data download or accept a download offer. Alternatively the acceptance key stroke may be specified in the offer, for example, where more than one information download option is provided, the key stroke may be used to determine which information is requested. For example, a content providing device advertising a house for sale may have the options of downloading only basic details for the property such as the real estate agent, address, price range estimate and number of bedrooms, or downloading full details of features and including images of the property. In this case the offer may for example specify: "Press 1 to download basic details or press 2 to download full details and images of this property." A key stroke to reject the offer may also be used. Alternatively or additionally a time-out may be used to terminate the communication between the mobile terminal and the content providing device where the user has made no response to the offer by the expiry of the time-out period.

A difficulty with displaying content on mobile terminals is that the original content format may not be suitable for display on the small screen of a mobile device. Due to the variety of mobile terminals a variation in display capabilities between them, it is almost impossible for generic content provider such as an Internet web site, which typically provides content for display on a terminal such as desk top personal computer (PC), to provide content data in a form also suitable for display on mobile a range of mobile terminals. Embodiments of the present invention can overcome this problem by providing a formatting component to format the content data stream according to the particular display attributes of the mobile terminal to enables it to be displayed on the mobile terminal.

In a preferred embodiment the formatting component divides the content data stream into a sequence of consecutive segments according to predetermined parameters based on the display capability of the mobile terminal. Any content which cannot be displayed by the mobile terminal, for example images where only text is capable of being displayed, can be allocated as an undisplayable segment. The segments are based on device display capability parameters such as screen size and resolution as well as user specified parameters, such as font size, colour mode, automatic scrolling mode or one-screen-at-a-time display mode.

Figure 2:
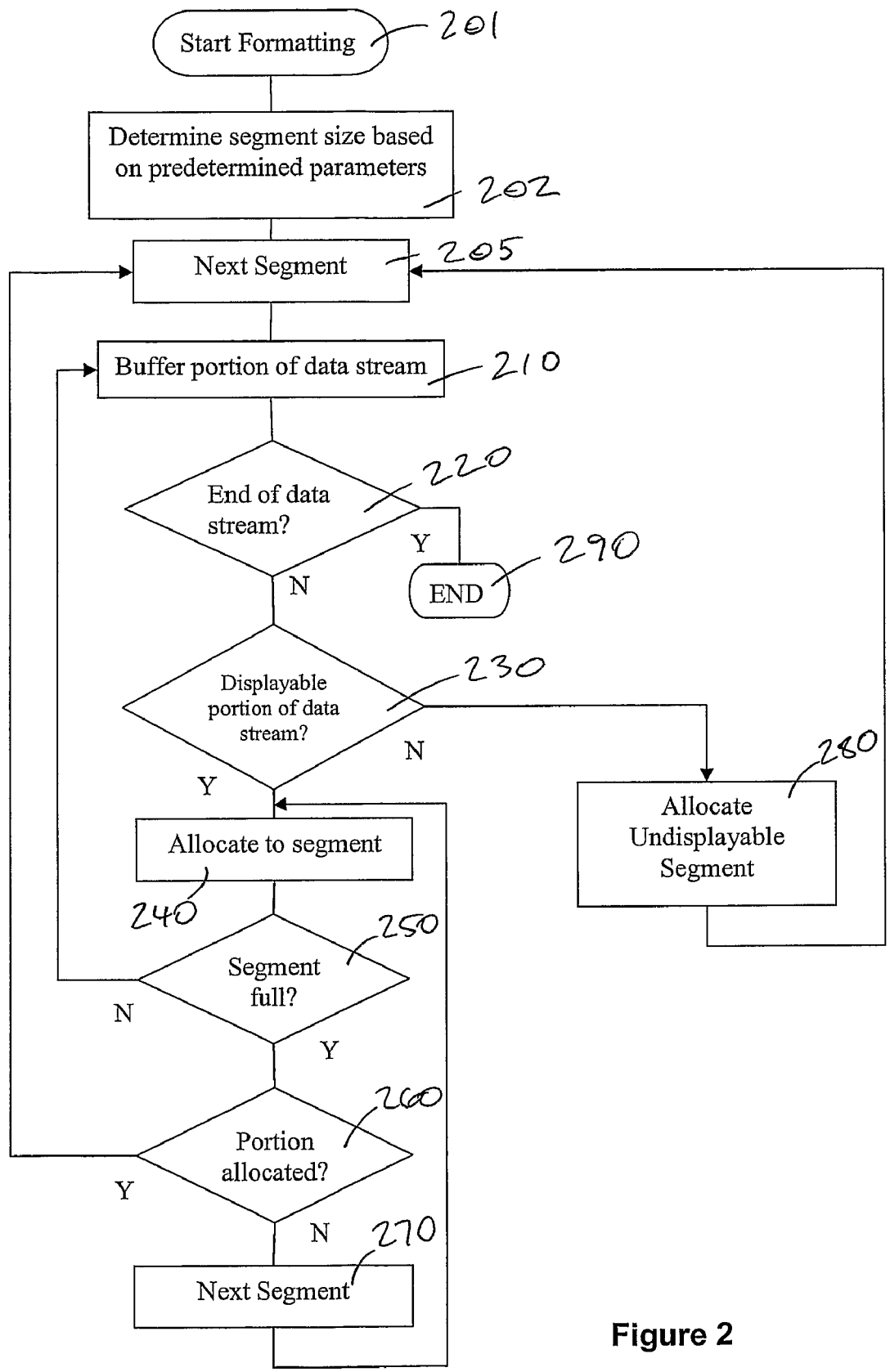
FIG. 2 is a flowchart representing an embodiment of the formatting method.

An example of the formatting method is illustrated in FIG. 2. Step 201 indicated the start of the formatting. The formatting component 120 determines the segment size for the mobile terminal based on predetermined parameters in step 202. For example, the segment size may be based on the number of characters displayable across the screen for a particular terminal screen size and user designated font size. The segment pointer is initiated (for the first segment) or incremented (for subsequent segments) in step 205. In step 210 a portion of the data stream is read into a buffer, if there is no data in the buffer this indicates the end of the data stream 220 and formatting has ended 290. The formatting component determines whether the buffered portion is displayable on the mobile terminal in step 230. For example, where a mobile terminal is only capable of displaying text then image data will be recognised as undisplayable. Where the data is displayable, data is allocated to a segment in step 240. Depending on the size of each segment the buffer may be smaller or larger than a data segment. If it is determined in step 250 that the segment is not full, the formatting returns to step 210 so a further portion of the data stream is read in to the buffer and steps 210 to 250 are repeated until the segment is full. If the segment is full (step 250) the formatting checks whether the buffer has been fully allocated to segments in step 260, if not then the segment pointer is incremented in step 270 and the formatting repeats steps 240 to 260 until the portion is fully allocated into a number of segments. Once the portion is fully allocated to segments the formatting returns to step 205, such that the above steps are repeated until the entire data stream is formatted. The formatted segments may be displayed by the display component concurrently with the formatting, or the entire data stream may be formatted before display depending on the capabilities of the mobile terminal or user preferences.

Where data is not displayable on the mobile terminal each undisplayable segment may be substituted during formatting with a segment including displayable text data indicating where the user may access the undisplayable content from, for example a link to a website or other reference such as a phone number or contact address to enable the user to obtain or locate the undisplayable content. For example, where the content is information about a house for sale, images of the house may be undisplayable on the mobile terminal. Each undisplayable segment may be replaced with a segment providing the Internet address of the real estate vendor and a reference number for the property to enable to the user to easily locate and view the images using their PC.

The formatting can also include a document format conversion step, for example documents may be provided in a number of formats such as: Word, PDF, WEB, WAP, WML, HTML, HXTML, XML, XSL etc documents in messaging formats such as SMS, MMS, EMS, or HMS (Hand Written Messaging) can also be provided, such a document is converted to a pure text or text and image format before executing the above formatting. This pre-processing step may be performed on the mobile terminal or by a formatting component provided in another device, such as a PC, before the mobile terminal acquires the content data stream. Alternatively, the formatting processing as described above can also be implemented by an external device such as a PC, such that the data stream is acquired by the mobile terminal already divided into segments appropriate for display. For example, this formatting may be performed on documents by the user's PC for subsequent downloading of the formatted data stream for later display on a mobile terminal, to reduce the processing and hence the battery power required by the mobile terminal later to display the documents.

The operation of the formatting component 120 according to one embodiment of the invention which enables the scrolling on text on a mobile phone screen will now be described in detail with reference to FIGS. 5 to 11.

Figure 5:
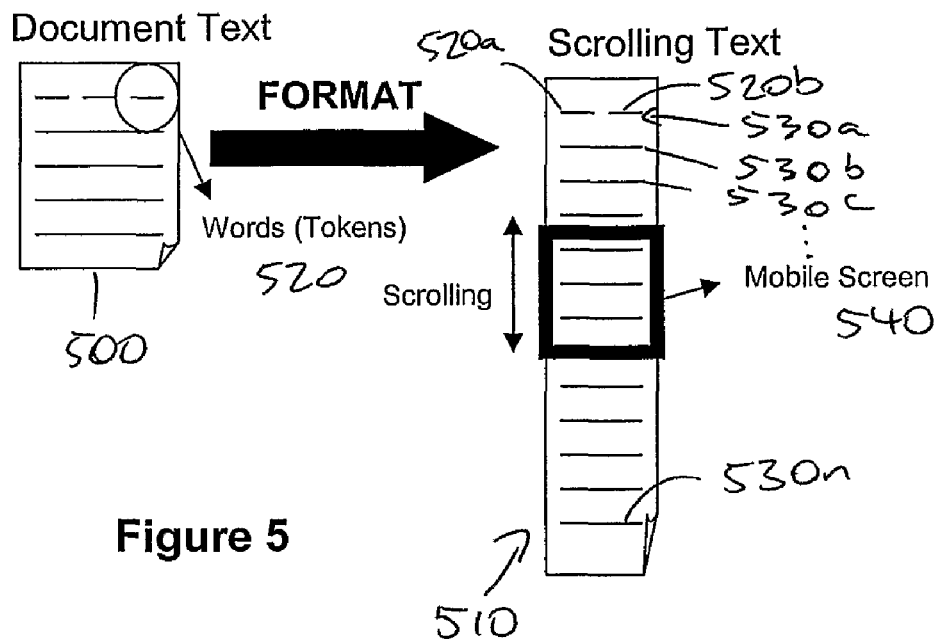
FIG. 5 illustrates an embodiment of the present invention for providing scrolling text on a mobile terminal.

A example where the content is provided in a plain text format will now be described with reference to FIG. 5. In this example the content data stream is plain text data. An input line of text from the document 500 is divided into a number of segments 530a-n based on the number of characters that can be displayed on one line across the screen of the mobile terminal. This division into segments can be based on whole words 520 to avoid words being split across more than one line, where possible. For example, this is illustrated in line 530a which comprises two words 520a and 520b. Where the number of characters in a word is greater than the number of characters displayable on one line it will be necessary to split the word across more than one line. Alternatively another operation such as reducing the font size for that word or substituting with an abbreviation may also be performed to enable the word to be more clearly displayed.

In this embodiment, each segment 530 in the sequence 510 corresponds to a line of text to be displayed on the mobile terminal screen 540 and a number of lines can be simultaneously displayed. To provide the scrolling text functionality, the position coordinates where each segment is displayed on the screen 540 are incremented and the display refreshed after each increment such that for each successive increment the displayed text will appear to have moved up, down, left or right on the screen 540 depending on the scrolling direction. As one segment reaches the edge of the screen and ceases to be displayed the next segment will be begin to be displayed on the opposite edge of the screen.

Figure 6:
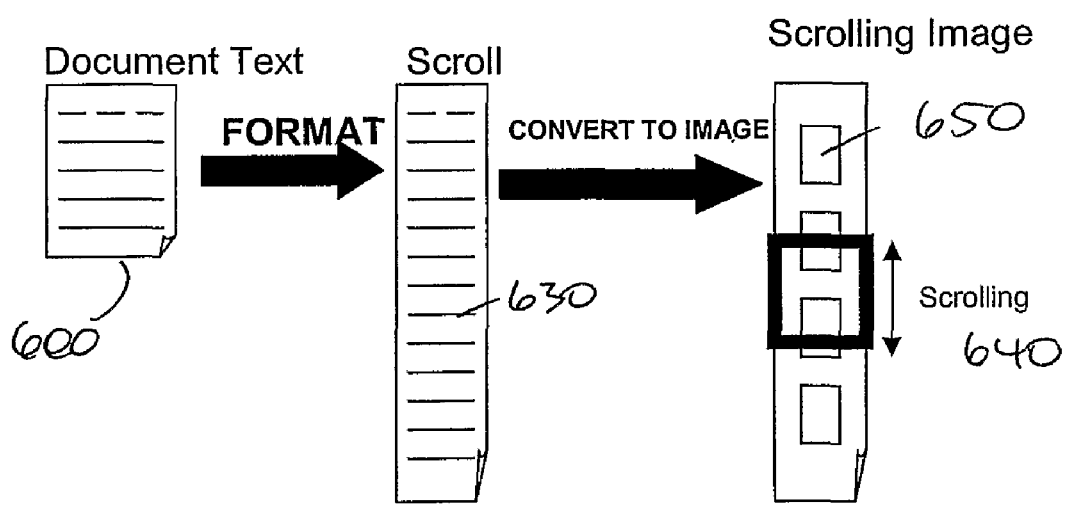
FIG. 6 illustrates an embodiment of the present invention for providing scrolling text as images on a mobile terminal.

The scrolling may increment by line or by a number of pixels. In an embodiment where the scrolling is incremented by a number of pixels the test Can be drawn as an image on the screen, rather than using text characters an example is illustrated in FIG. 6. The text document 600 is converted into the sequence 610 of segments 630. Each test segment is drawn on the screen 640 as an image 650. The images represent the content of the text document in an image format displayable by the mobile terminal. The scrolling effect is achieved by incrementing the absolute display position of each segment on the screen by a number of image pixels.

Drawing text as images also enables the text font and text size to me modified easily based on user preferences. A user settable parameter can be used to set the font size (i.e. small, medium or large). The drawing of text as images also enables support for text content in a variety of languages such as Chinese, Arabic, Hebrew, Japanese, Korean etc.

Figure 7:
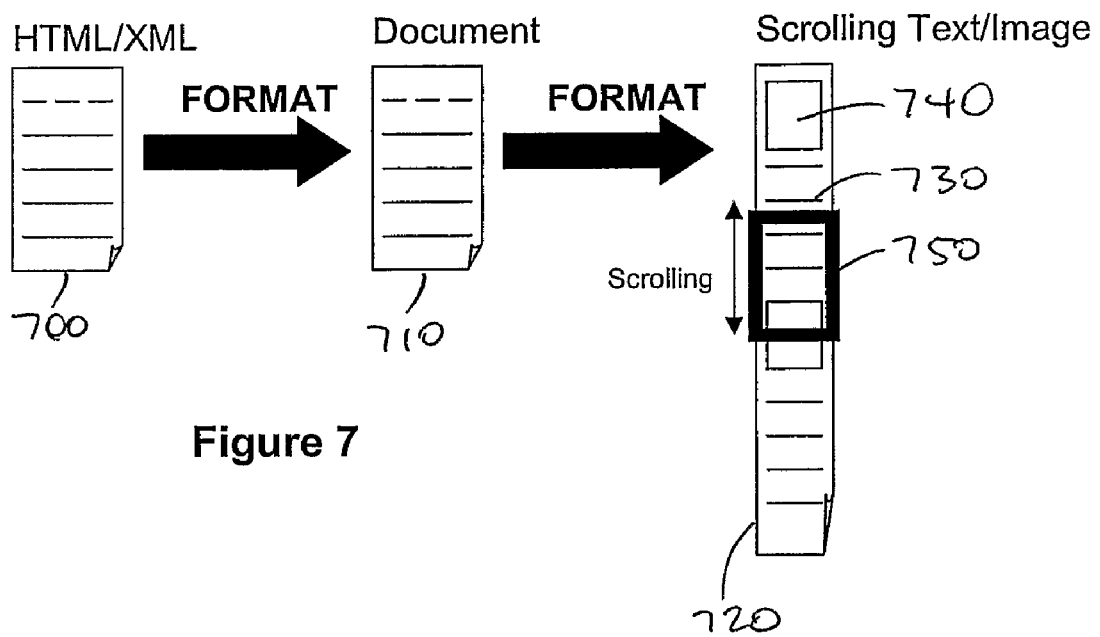
FIG. 7 illustrates an embodiment of the present invention for providing scrolling text and images on a mobile terminal.
Figure 8:
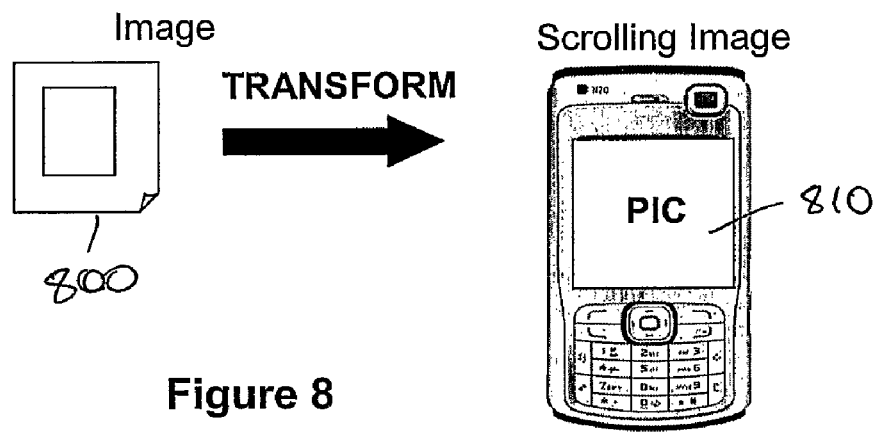
FIG. 8 illustrates an embodiment of the present invention for providing a scrolling image on a mobile terminal.

FIG. 7 illustrates an embodiment of the present invention for providing scrolling text and images on a mobile terminal. In this embodiment a document 700, for example in HTML or XML format such as an RSS feed file is input as the content data stream, from this document text and image data are extracted 710 and divided into a sequence 720 of text 730 and image 740 segments respectively. These images are displayed on the screen 750 either as images and the scrolling effect achieved by position increments based on pixels as described above, or as text and images and the scrolling effect achieved by a combination of line position increments for the text and pixel based position increments for the images.

Where images are displayed the formatting may also include the steps of transformation and scaling of images to enable them to be displayed on the mobile terminal screen. FIG. 8 illustrates an embodiment of the present invention for providing a scrolling image on a mobile terminal. An image 800 in a common image format, such as PDF, JPEG, TIFF etc, is transformed into an image format displayable by the mobile terminal and scaled to fit the size and resolution of the mobile terminal screen 810. This transformation can include reducing the resolution of the image, for example converting a high resolution JPEG image to a lower resolution JPEG image, scaling the image to the screen size, conversion of image format for example converting a JPEG to a bitmap or thumbnail format, cropping the image to the size of the screen or a combination of two or more of these operations.

Figure 9:
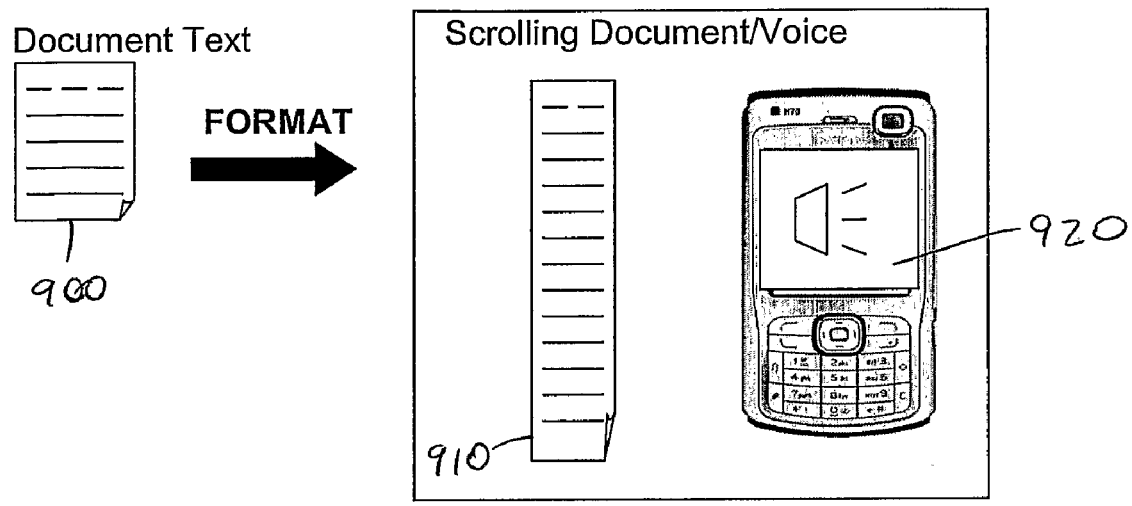
FIG. 9 illustrates an embodiment of the present invention for providing scrolling text and voice content on a mobile terminal.

Some embodiments of the present invention can also transform text documents to voice to enable either text and voice output or just voice output. This enables a user to listen to a voice representing the text scrolled on the display screen. FIG. 9 illustrates an embodiment of the present invention for providing scrolling text and voice content on a mobile terminal. In this embodiment a text document 900 is divided into a sequence of segments 910 as described above. Text to voice recognition software is then used to convert each segment into signals to be output by the mobile terminal 920 speakers as voice. The scrolling player functionality displays the text scrolling on the screen synchronised with the voice output. During the scrolling of the text the user can listen to a voice "reading" the text scrolled on the mobile terminal screen.

Figure 10:
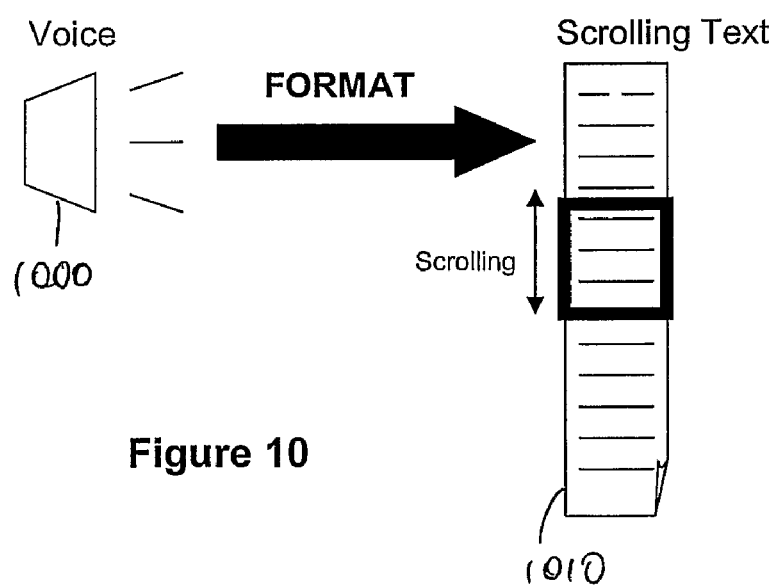
FIG. 10 illustrates an embodiment of the present invention for providing scrolling text from voice data on a mobile terminal.

Conversely, voice-to-text recognition can be used to generate text for display on the mobile terminal. FIG. 10 illustrates an embodiment of the present invention for providing scrolling text from voice data on a mobile terminal. In this embodiment the voice 1000 is input either as an audio data stream or by direct voice input to a microphone of the mobile terminal which is then converted to an audio data stream. Voice-to-text recognition software is used to convert the audio data stream into a text data stream which is divided into segments for display and scrolling by the scrolling player as described above. The text scrolling speed can be synchronised to the talking speed by adjusting the display position increments dynamically based on the talking speed, for example by monitoring the word rate of a vocal input.

Figure 11:
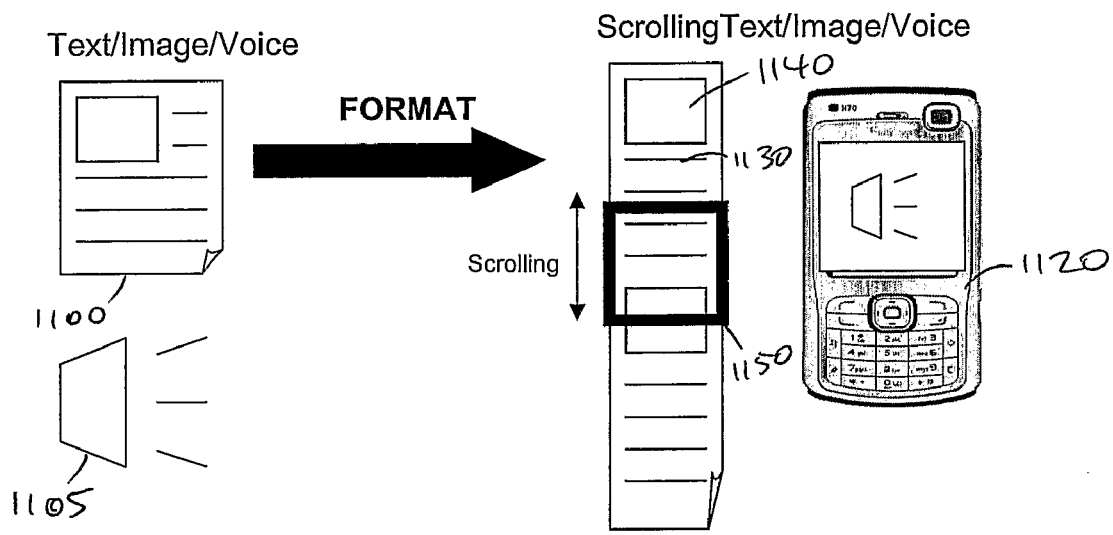
FIG. 11 illustrates an embodiment of the present invention for providing scrolling text, voice and image content on a mobile terminal.

FIG. 11 illustrates an embodiment of the present invention for providing scrolling text, voice and image content on a mobile terminal. This embodiment utilises a combination of the embodiments described above. The formatted file can contain instructions for the display of different segments, for example key words relating to the format of each segment or for particular display attributes such as font colour or size for some segments. An example of such display instructions is given below:

```
Line one text....
Line two text ....
<<<IMAGE name=dog.jpeg....other attributes>
Line three text...
<<<LINE font=BOLD, colur=RED....other attributes>
Line four text...
Line five text....etc.
```

In this example, this text "Line one text . . . " and "Line two text . . . " are displayed as plain text on the screen, then the image is displayed. The third line of text "Line three text . . . " will be displayed in bold font and coloured red, then the following two lines "Line four text . . . " and "Line five text . . . " are displayed in plain text. These display attributes can be part of each display data segment or attributes associated with each segment.

Figure 3:
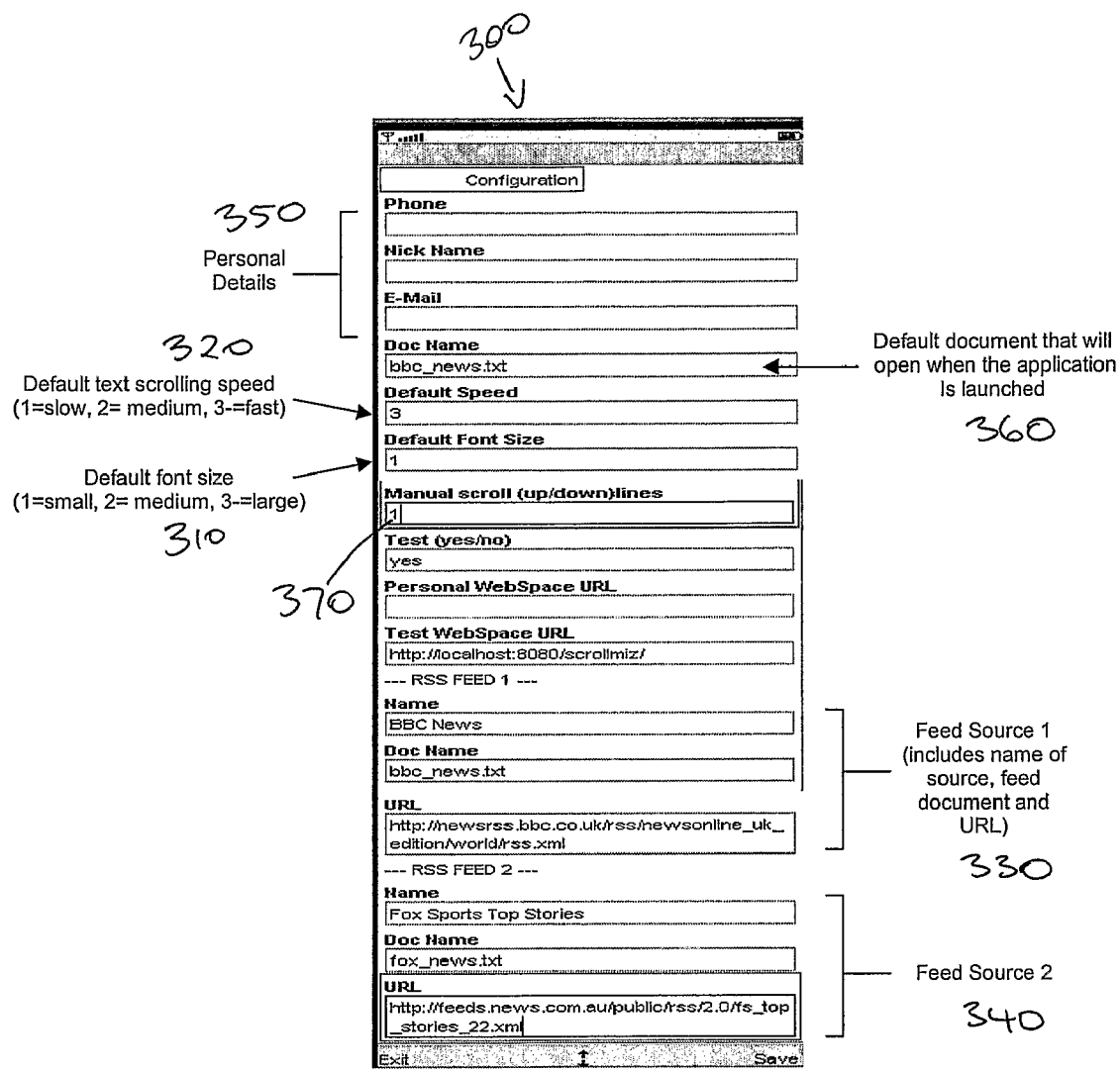
FIG. 3 is an example of a configuration screen for viewing and setting user variable parameters.

An example of user settable parameters is illustrated in FIG. 3. The user settable parameters can be set using the user interface of the mobile terminal or using associated support functions for example installed on a PC or on a web site which is enabled to communicate with the mobile terminal.

As seen in FIG. 3 user parameters can include the users personal details 350; parameters relating to the display settings, such as font size 310 and scrolling speed 320 and manual scrolling increments 370; and parameters related to stored content, such as a document to display when the application is opened/launched 360, or parameters to enable content acquisition such as feed sources 330, 340. Selection of the feed sources from the mobile terminal menu will automatically trigger the mobile terminal to establish a connection to the feed source to acquire and display the content data stream as described above.

Figure 4:
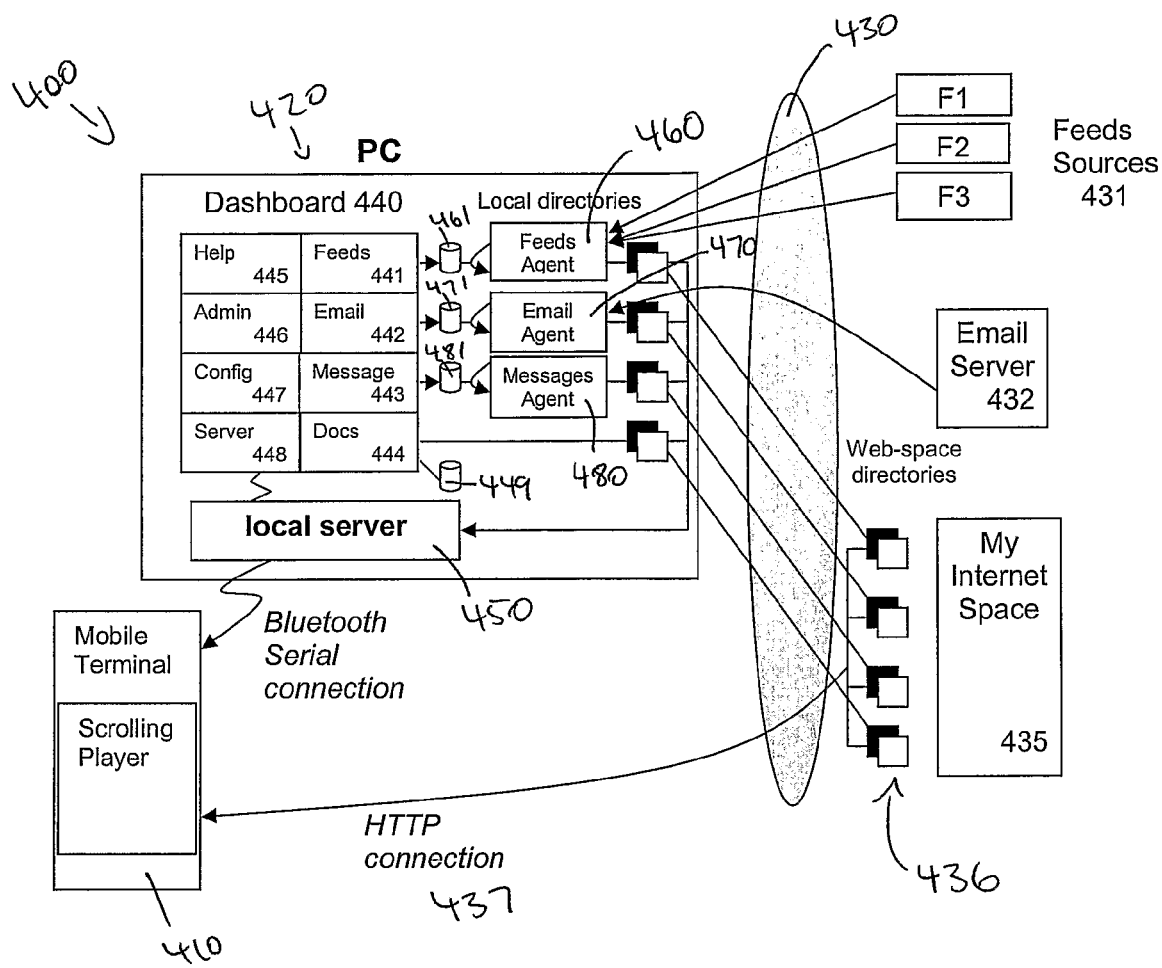
FIG. 4 is a block diagram illustrating the interaction between a mobile terminal, content providers, and support applications according to an embodiment of the present invention.

An embodiment of associated support functions external to the mobile terminal content acquisition and display system will now be described with reference to FIG. 4. In the system 400 of FIG. 4 the mobile terminal 410 is provided with scrolling player functionality as described above. Support (backend) applications are also provided on a PC 420. The support applications include several programs. These include a Dashboard 440, a Local Server 450 as well as a number of Agent Programs such as Feeds Agent 460, Email Agent 470, and Message Agent 480.

The Local Server 450 connects to the Mobile terminal via a serial or Bluetooth connection and sends information from the PC to the mobile terminal (e.g. feeds).

The Agent Programs are services that are designed to automatically download specific information via the Internet 430. There are several types:

The Feeds Agent 460 downloads specific information from particular feeds sources 431 (e.g. news, weather, movie times, etc. . . . ) These feeds are stored as files on the PC 420 in local directories 461 and can be sent to the mobile terminal 410 via the Local Server 450.

The Email Agent 470 retrieves e-mails from the email server 432 and stores them as files on the PC 420 in local directories 471. As with Feeds, Emails can be sent to the mobile terminal 410 via the Local Server 450.

The Message Agent 480 retrieves messages sent from another mobile phone or via messaging services and stores them as files on the PC 420 in local directories 481. As with Feeds and Emails, messages can be sent to the mobile terminal 410 via the Local Server 450.

The Dashboard 440 is used to perform a number of functions and provides a user interface via the PC for updating user parameters for subsequent downloading to modify the user parameters on the mobile terminal 410, some examples are given below:

The Dashboard Feeds function 441 can be used to start, stop, create and customise parameters for the feeds agent 460. The Feeds function 441 also sends particular feeds to the user's Internet Space 435.

The Dashboard Email function 442 can be used to start, stop, create and customise the Email agent 470. The Email function 442 also sends particular emails to My Internet Space 435.

The Dashboard Message function 443 can be used to start, stop, create and customize the message agent 480. The Message function 443 also sends particular messages to My Internet Space 435.

The Dashboard Docs function 444 opens a browser where documents can be saved into a directory 449. The Local Server 450 is configured to access the directory 449 and will retrieve the document and send it to the mobile terminal 410 (via a serial or Bluetooth connection) upon initiation by the user.

The Dashboard Help function 445 contains a help file to assist with the operation of system including the applications on the mobile terminal 410.

The Dashboard Admin function 446 performs housekeeping functions such as clearing, maintaining and updating directories. The Admin function 446 also copies files from the local directories 461, 471, 481, 449 to the user's Internet Space 435 (the files are stored in web-space directories 436).

The Dashboard Config function 447 is used to customise user specified parameters such as scrolling speed, directory names, colours, etc. . . . . The Config function 447 also defines the directory pathway for Local directories and the URL for WebSpace Directories. Parameter values updated using the config function 447 are updated on the mobile terminal 410 via the local server 450.

The Dashboard Server function 448 starts, stops and customizes the Local Server 450 operations.

Placing files on user's Internet Space 435 enables a user to access their files directly via an Internet connection from the mobile terminal 410. This allows you the user to read their files without having to download them from their PC 420 to the mobile terminal 410, for example the document is transmitted as a content data stream to the mobile terminal 410 via HTTP connection 437. The content data can be deleted automatically from the mobile terminal 410 memory once the document is closed. E-mails can be copied to the user's Internet space by the e-mail agent 470 for viewing as above. Alternatively the mobile terminal can be configured to communicate with the e-mail server via a telecommunication network and the Internet or e-mails can be downloaded to the mobile terminal by the e-mail agent and local server for storage and viewing on the mobile terminal.

From the perspective of the mobile terminal 410, the content acquisition and display functionality is provided as a software application which can be run on the mobile terminal. The software can be pre-installed on the mobile terminal by the manufacturer or downloaded to the mobile terminal by the user. The application will typically be launched by selecting the application from the mobile terminal application menu. Alternatively, a specific key press sequence or other means such as a voice command may a used to open/launch the application. The application may also be set to automatically launch when the mobile terminal is turned on or in response to another action such as a phone call ending. On opening or launching the application can be programmed to open and display a user specified document or feed automatically. While the content acquisition and display application is running the user can navigate using the application's menu system (the application is closed to return to the mobile terminal menus).

A common architecture and technology foundation based on an ICF (Intelligent Client Framework) software foundation, utilizing the Sun's J2ME and Microsoft C# targeting ".Net Compact Framework" operating environments can be used to implement both the mobile terminal functionality and the dedicated content provider functionality.

The use of limited range wireless communication such as Bluetooth is also utilised. For example this technology is used for: mobile terminal to mobile terminal communication and data exchange; mobile terminal to PC communication and data exchange; and mobile terminal to Internet communication and data exchange via a PC and Bluetooth connection.

The ICF architecture provides functionality including: user interface control, processing intelligence, and persistence and communication to web services. Special consideration has been given while developing the ICF, as there are hardware restrictions on mobile devices and hence it must have a small footprint to run on limited memory. It also provides its own lightweight local database.

Figure 17:
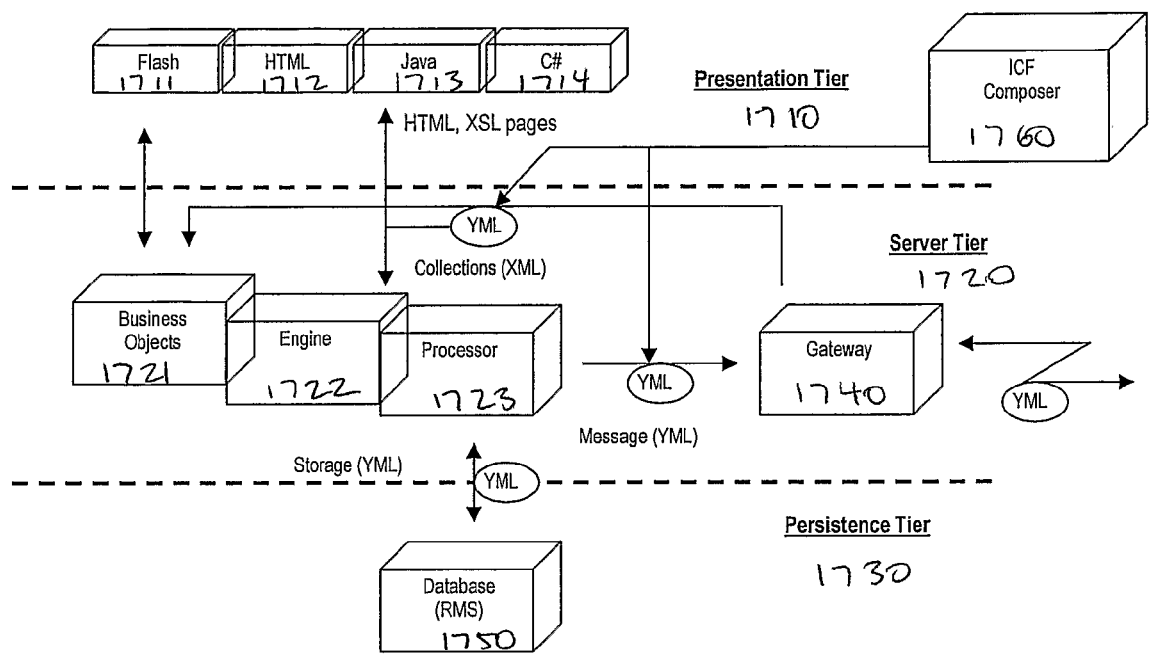
FIG. 17 illustrates the architecture for mobile terminal applications and content providing devices of embodiments of the present invention.

The ICF architecture is illustrated in FIG. 17 and comprises three tiers, a presentation tier 1710, a server tier 1720, and a persistence tier 1730.

The Presentation tier 1710 provides software components and applications to handle user interface functions such as the inputting and display of data, for example data formatting and display, and menu display functions. ICF provides generic classes to handle display and data entry operations mainly utilising the J2ME foundation. Examples are classes such as "BaseCanvas", "BaseForm", etc. presentation tier 1710 may include applications developed using a number of different languages or formats such as Java applets 1712, Flash 1711, C#1714 or HTML 1712. Presentation tier 1710 applications can include formatting and display components of a scrolling player application for a mobile terminal. The presentation tier may also include a composer application 1760 to enable a user to construct, edit, and store documents in a format already adapted for display on a mobile terminal as described above.

The Server tier 1720 is the foundation of the ICF software utilising a generic framework that commonly used for mobile applications, the server tier includes the process control, scheduling, processing logic, and communication gateway functions. For example a mobile application framework includes the following:

- an Engine 1722 component which represents the overall application flow, processing logic, and business rules.
- Business Objects 1721 are generic templates for developing specific domain objects for data and parameters. A specific XML structure, referred to as YML is the foundation for these objects. For example, specific Business Objects are inherent generic objects that include validation and data access and update.
- Processors 1723 enable multi-thread functions such as timer, scheduler, etc.
- Gateway 1740 provides the communication interface to other devices, for example the gateway for the preferred embodiment includes a generic Bluetooth interface along with functionality for preparing, transmitting and receiving messages according to customised functionality.
- API Components and libraries which include YML and persistence handling as well as other utilities that are commonly used across mobile applications (e.g. formatting tools, date and time management, etc.) can also be provided in the server tier 1720.

The persistence tier 1730 provides the support for storing content data and user specified parameters (preferences). For example, where the application is provided on a mobile terminal the persistence tier provides lightweight database 1750 functionality in the mobile terminal memory.

The ICF provides for access to content and services via the following methods:

Real Time access—In this state, the ICF communicates directly with the server in real-time, i.e. connected to a wireless network or via synchronized technologies. Device (local) access—In this state, the ICF accesses and stores content on the device itself, for a later stage to upload to the server (i.e. Real Time access) A combination of the above methods—here, the ICF accesses and stores content on the device as well as communicating in real time with the server. The business rules embedded in the ICF dictate which method is utilized.

XML technology, particularly the using a specific XML structure, referred to herein as YML, designed for use with the ICF is utilised to support: persistence of data on the mobile terminal; data communication and exchange between the mobile terminal and the backend support functions provided on a PC or other device; and maintenance of user and system (mobile terminal) parameters. An example of the YML structure is given below:

```
<?xml version="1.0" encoding="ISO-8859-1"?>
<collections>
    <collection n="COLLECTION_NAME">
        <group n="GROUP_NAME">
            <object n="OBJECT_NAME">
                <f n="FIELD_NAME">FIELD_VALUE</f>
                <f n="FIELD_NAME">FIELD_VALUE</f>
            </object>
            <object n="OBJECT_NAME">
                <f n="FIELD_NAME">FIELD_VALUE</f>
                <f n="FIELD_NAME">FIELD_VALUE</f>
            </object>
        </group>
        <group n="GROUP_NAME">
            <object n="OBJECT_NAME">
                <f n="FIELD_NAME">FIELD_VALUE</f>
                <f n="FIELD_NAME">FIELD_VALUE</f>
            </object>
            <object n="OBJECT_NAME">
                <f n="FIELD_NAME">FIELD_VALUE</f>
                <f n="FIELD_NAME">FIELD_VALUE</f>
            </object>
        </group>
    </collection>
</collections>
```

The collection includes one or more groups with each group comprising one or more objects. Each object can include one or more fields.

This XML structure is used commonly throughout the ICF architecture, for example content data is stored as a series of objects, parameters such as properties of the mobile device and user preferences are also defined as objects. This structure is also used for message content. An example of a specific "VERIFY_USER" request and response messages exchanged between a mobile terminal application and a backend application on a PC utilising YML:

```
<?xml version="1.0" encoding="ISO-8859-1"?>
<collections>
    <collection n="COLLECTION">
        <group n="GROUP">
            <object n="HEADER">
                <f n="APP_NAME">SCROLLING_PLAYER</f>
                <f n="REL_NAME">LIGHT</f>
                <f n="VER_NAME">010000</f>
                <f n="CMD_NAME">VERIFY_USER_REQUEST</f>
                <f n="TIMESTAMP">051220062108</f>
                <f n="P_CNT">2.txt</f>
```

```
            <f n="P1">USER_ID </f>
            <f n="P2">PHONE_NO </f>
        </object>
        <object n="BODY">
            <f n="USER_ID">GIL</f>
            <f n="PHONE_NO">61414809220</f>
        </object>
      </group>
   </collection>
</collections>
```

The request message includes: a header object, which includes fields identifying the application, and the message purpose "verify user request"; and a message body object including the user information to be verified.

An example of the YML response message to the VERIFY_USER_RESPONSE command is give below:

```
<?xml version="1.0" encoding="ISO-8859-1"?>
<collections>
    <collection n="COLLECTION">
        <group n="GROUP">
            <object n="HEADER">
                <f n="APP_NAME">SCROLLING_BACKEND</f>
                <f n="REL_NAME">LIGHT</f>
                <f n="VER_NAME">010000</f>
                <f n="CMD_NAME">VERIFY_USER_RESPONSE</f>
                <f n="TIMESTAMP">051220062108</f>
                <f n="P_CNT">1.txt</f>
                <f n="P1">STATUS </f>
            </object>
            <object n="BODY">
                <f n="STATUS">ACCEPT</f>
            </object>
        </group>
    </collection>
</collections>
```

Again the message includes: a header object which identifies the application, and the message purpose "verify user response"; and a message body object which includes the status (i.e. ACCEPTED).

In the preferred embodiment of the invention the same architecture is used for the application running on the mobile terminal as for the backend or support applications running on a PC, for example as described above with reference to FIG. 4. The gateway 1720 provides the local server 450 functions for the PC applications and on the mobile terminal the gateway 1720 provides the content acquisition interface 110. This architecture symmetry also enables a mobile terminal to operate as a content providing device.

The scrolling player enables text and images to be scrolled automatically on a mobile terminal, so a user can read it without the need to use a key stroke. The user can control the size of the font, the speed of the scrolling and many other attributes. The content data is "played" like music, the user can scroll faster or slower, pause, increase or decrease font size and change the scrolling direction. The ability to adjust the font size is particularly advantageous to long sighted, elderly, or vision impaired users.

Figure 16A:
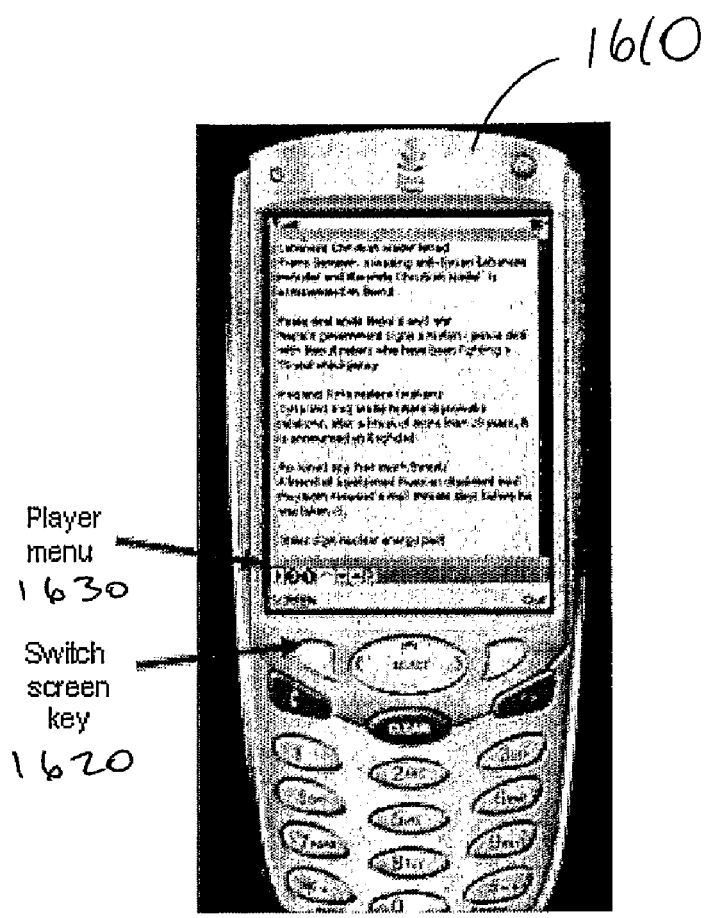
FIGS. 16a and 16b illustrate an example of a scrolling player according to an embodiment of the invention.

FIG. 16a shows an example of a feed being displayed on the mobile phone 1610. A feed may also contain links to other feeds. For example, the feed displayed on the phone 1610 is from a news source. Each paragraph describes a different article. The full article can be downloaded by pressing a key such as a 'select' or 'enter' key. Keys to perform various functions, such as 'select', 'switch screen', 'return to menu' etc can be specified for the particular mobile terminal.

A marker on the display may be used to indicate which paragraph is active. For example, a dashed red line on the left hand side of the paragraph can indicate that the paragraph is active and pressing a specified 'select' key will open the article relevant to that paragraph.

A 'switch screen' key 1620 allows the user to go back and forth between the document/article that has been opened, the feed it came from and the last menu activated.

The user may choose to scroll manually through a feed or article using the up and down keys or play the feed in an automatic scrolling mode.

Figure 16B:
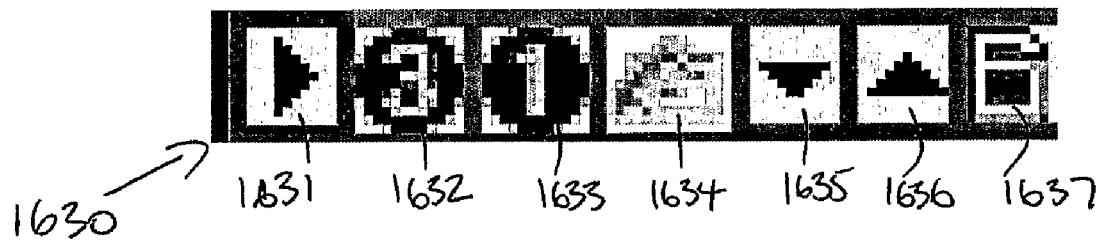

A scrolling player menu 1630 is provided to enable the user to control the scrolling. An example of a scrolling player menu 1630 comprising a number of icons 1631-1637 is shown in FIG. 16b. The user can move between these icons 1631-1637 using the left and right keys and select an icon by pressing a 'select' or 'enter' key. In the embodiment shown the icons include: a Play icon 1631 to start and pause (by pressing 'select' while playing) scrolling; a Text scrolling speed icon 1632 to increase or decrease the scrolling speed using up and down keys; a Font Size icon 1633 to adjust the font size up or down using the up or down keys; a Main menu icon 1634 to return to the main menu; a Manual scroll down icon 1635; a Manual scroll up icon 1636; and a Save icon which enable the user to save the feed or article to the mobile terminal memory.

The scrolling player enables the user to modify the parameter settings while data content is being displayed. For example, the user can pause, speed up or slow down the scrolling. The scrolling player also enables the font size of test to be changed during display. Where the font size is changed the content data is re-formatted for subsequent based on the selected font size and the screen parameters (such as screen width). The entire content stream may be re-formatted or the re-formatting may start from the presently viewed content segments and only re-format segments yet to be displayed (according to the scrolling direction). This re-formatting can comprise altering the segment size, for example by a number of characters, based on the screen line length for the chosen font, this display component will then draw the text or text as an image using the new font size. Alternatively the segment size and number of segments per line can be based on the font size options, for example one segment may be displayed per line for font size "1", two segments per line for font size "2", and three segments per line for font size "3", in this case the appropriate number of segments are selected for each line as the font size is changed.

The scrolling player is also provided with its own menus. The menu enables the user to navigate through viewing and administrative functions. The viewing functions enable the user to download, view and save feeds and articles from the Internet and view feeds and articles that are saved on the mobile terminal. The administrative functions enable the user to edit configuration settings, view and delete logs, delete documents from the mobile terminal memory, and reset configuration settings to default settings.

It should be appreciated from the above description that there are three main methods by which information can be acquired and stored by the mobile terminal for display to simplify the locating and downloading of information to a mobile terminal. The first is a "do it yourself" method where the user has the utility (for example using an application installed on a PC) to convert the document to the necessary format, and transmit and play it on their mobile terminal. The second is where a user moves, copies, or links documents to their own web site and can convert and receive information on their phone, functionality can be provided on the mobile terminal to link directly to this web site and aid searching for the required document to make the information retrieval as easy as possible from the mobile terminal. A third option is where information is sent to a support function web site for formatting in a format which can then be sent to the mobile phone for display. A further option is where information is offered and sent directly to the mobile terminal. The advantages of these content acquisition options is that the complexity of the data acquisition by the user from the mobile terminal is significantly simplified.

Figure 21:
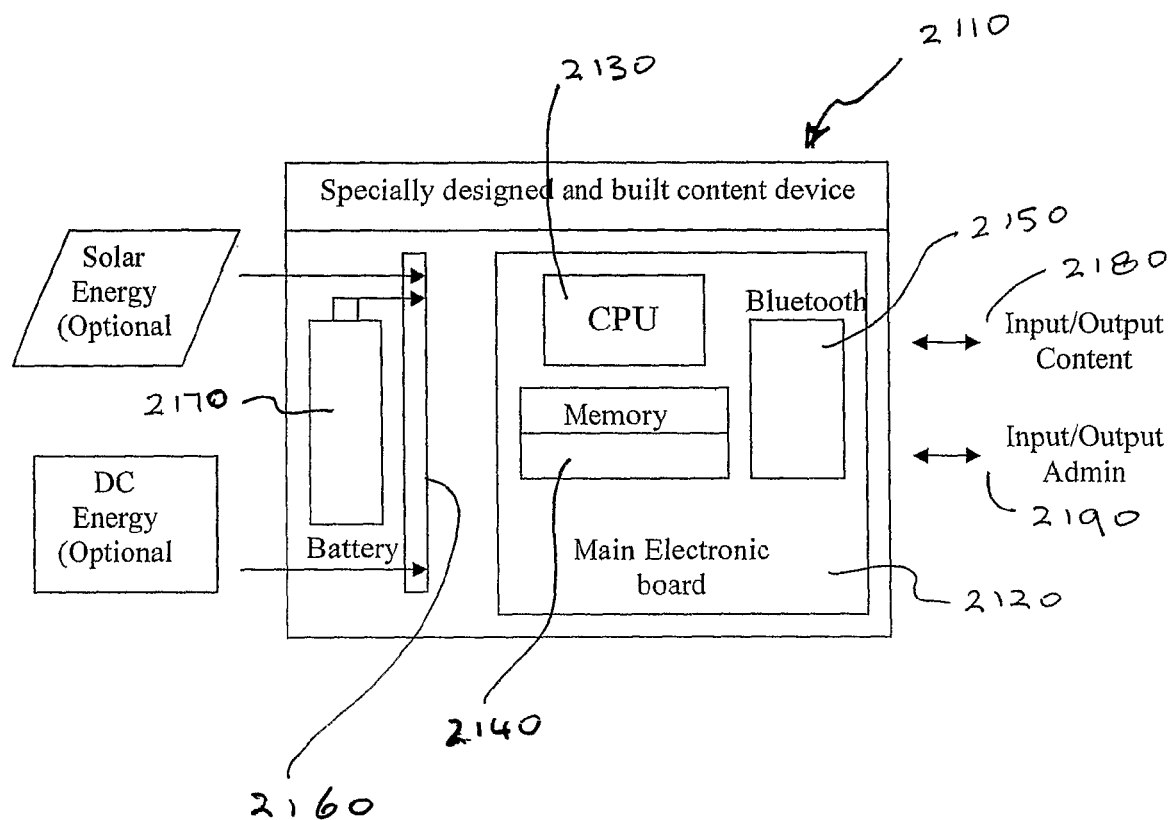
FIG. 21 illustrates the architecture for an alternative content providing device.

FIG. 21 shows an alternative embodiment of a content providing device which is purpose built as a mobile content providing device. Here, the content providing device 2110 may be included as a stand alone unit or as part of an existing unit such as a mobile telephone terminal or a blackberry terminal, or the like. Here, the content providing device 2110 includes a main electronic board 2120 which may be a main circuit board in the mobile terminal or a daughter board added thereto. The board 2120 includes a central processing unit 2130 and a mass memory store 2140. It also includes a Bluetooth communicator 2150. Power for the device is provided through a source of power 2160 which may include a battery 2170 or alternative sources of energy such as a solar energy cell or an external DC energy source. Input/output content 2180 is provided through the Bluetooth connection. In this way, an administrator can input/output data 2190 which can be stored in the store 2140 and then transmitted as the output content 2180 by the Bluetooth communicator 2150. The CPU can be suitably programmed with an application to control operation of the device 2110.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A method for providing and displaying content on a mobile terminal with a display, the method comprising the steps of:

acquiring a content data by a mobile terminal;

launching a player application adapted to fully occupy the whole of the area of the display to automatically display content data on the display, and providing a graphical user interface of control features and displaying the graphical user interface concurrently with automatic display of content data to enable a user to interact with the graphical user interface whilst viewing the content data to control one or more visual parameters of the way the data content will be displayed while the content data is being displayed;

choosing a visual parameter value by use of the graphical user interface;

formatting the content data acquired by the mobile terminal according to a predetermined parameter based on display limitations for the mobile terminal, and according to the visual parameter value chosen by:

dividing the content data into a sequence of consecutive segments by identifying any portions of the content data that are capable of being displayed by the display, and dividing each displayable content portion into a sequence of one or more displayable segments based on the predetermined parameter and chosen visual parameter such that when each displayable segment is rendered in sequence by the player application the full content of the displayable portion is displayed sequentially in a viewing mode; and identifying any portions of the content data that are not capable of being displayed by the display and designating these portions of content in the sequence as undisplayable segments; and displaying the formatted content on the display, wherein a value of the one or more visual parameters can be accessed and modified during concurrent displaying of the content data using the graphical user interface to enable the content data to be dynamically formatted and displayed according to the modified value of the chosen visual parameter.

2. A method as claimed in claim 1 wherein the one or more visual parameters are any one or more of scrolling rate, scroll direction, font size, font type and colour mode.

3. A method as claimed in claim 1, further comprising the steps of:

making content data available for download to a mobile terminal from one or more content providers as one or more content data streams;

storing on the mobile terminal content acquisition data for one or more content data sources for use to acquire a content data stream;

displaying, via the player, a menu of selectable items associated with acquirable data streams; and causing the mobile terminal to acquire, format and display the content data in a scrolling mode on selection of a menu item.

4. A method as claimed in claim 1, where the chosen visual parameter is a text font size, and in response to modifying the value of the chosen visual parameter any displayable content portion comprising text is dynamically formatted by re-dividing the displayable content portion into displayable segments, based on a number of characters in a displayable in a single line for the text font size value and spaces in the text, such that where words in the text have less characters than are displayable in a single line for the font size, a boundary of each displayable segment coincides with a space in the text.

5. A method as claimed in claim 4, wherein the step of displaying the formatted content on the mobile terminal includes automatically scrolling the content segments on the display.

6. A method as claimed in claim 5, wherein scrolling the content segments includes the steps of:
   a. allocating position coordinates to one or more sequential content segments which can be simultaneously displayed, based on parameters for the display;
   b. simultaneously displaying the one or more sequential content segments on the display according to the position coordinates;
   c. incrementing position coordinates for the displayed segments such that a content segment displayed at an edge of the display will cease to be displayed, and allocating position coordinates to the next content segment in the sequence for display; and
   d. repeating steps b and c for the remainder of the sequence.

7. A method as claimed in claim 1, wherein the position coordinates can be incremented to effect scrolling of content on the screen in an up, down, left or right direction.

8. A method as claimed in claim 1, wherein a display on the display comprises an undisplayable content identifier for any undisplayable segment in the sequence.

9. A method as claimed in claim 8, wherein the identifier indicates a manner by which the undisplayable content can be obtained by the user.

10. A method as claimed in claim 1, wherein the parameter based on device limitations is any one or more of a display screen dimension, display screen resolution, image display capability, display buffer size, and font types.

11. A method as claimed in claim 1, further comprising the step of automatically converting content data from a document format to a plain text or plain text and image format before formatting the content data for display on the mobile terminal.

12. A method as claimed in claim 1, wherein the formatting step further comprises a step of converting content data to a text, text and image, or image format in accordance with one or more specified parameters.

13. A method as claimed in claim 12 wherein the display step further comprises converting any text to an corresponding audio voice output such that as a word of the text is displayed an audio voice reproduction of the word is simultaneously output.

14. A method as claimed in claim 12 wherein the formatting step further comprises converting audio voice data to corresponding text and formatting the text as displayable data segments such that as the audio voice data is output corresponding text is displayed.

15. A mobile terminal with a display having a resident computer application adapted to convert the mobile terminal into a graphic display player having a formatting component adapted to format content data according to a chosen visual parameter and a predetermined parameter based on display limitations for the mobile terminal, whereby the graphic display player fully occupies the whole of the area of the display to automatically displays content data on the display, and provides a graphical user interface of control features and displays the graphical user interface concurrently with automatic display of content data to enable a user to interact with the graphical user interface to control one or more visual parameters of the way the data content will be displayed, to choose a visual parameter value while the data is being displayed and wherein the data is formatted by:
   dividing the content data into a sequence of consecutive segments by identifying any portions of the content data that are capable of being displayed by the display, and dividing each displayable content portion into a sequence of one or more displayable segments based on the predetermined parameter and chosen visual parameter value such that when each displayable segment is rendered in sequence by the graphic display player full content of the displayable portion is displayed sequentially in a scrolling mode; and
   identifying any portions of the content data that are not capable of being displayed by the display and designating these portions of content in the sequence as undisplayable segments,
   wherein a value of the one or more visual parameters can be accessed and modified during concurrent displaying of the content data using the graphical user interface to enable the content data to be dynamically formatted and displayed according to the modified value of the chosen visual parameter.

16. A system for providing and displaying content on a display of a mobile terminal having a display, the system comprising:
   a content acquisition interface module implemented as a set of instructions stored in memory of the mobile terminal and executable by the mobile terminal adapted to enable the mobile terminal to acquire content data from one or more content providers;
   a graphic display player application implemented as a set of instructions stored in memory of the mobile terminal and executable by the mobile terminal to control the mobile terminal to automatically display content data and provide a graphical user interface of control features and, in a manner that occupies the whole area of the display, display the graphical user interface concurrently with automatic display of content to enable a user of the mobile terminal to interact with the graphical user interface using a user interface of the mobile terminal, to control one or more visual parameters of the way the content data will be displayed, to choose a visual parameter value while the content data is being displayed, the graphic display player having a formatting component adapted to format the acquired content data according to a predetermined parameter based on display limitations for the mobile terminal, and on the chosen visual parameter value
   wherein the content formatting comprises dividing the content data into a sequence of consecutive segments such that any portion of content data that is capable of being displayed by the display is divided into one or more displayable segments based on the predetermined parameters and any portion of content data that is not capable of being displayed is designated as an undisplayable segment in the sequence, such that the displayable segments can be displayed by the display consecutively; and a display component adapted to display the formatted content on the display,
wherein display of the formatted content is changed during display in response to the user accessing and modifying a value of the one or more visual parameters using the graphical user interface.

17. A system as claimed in claim 16, further comprising one or more content providing devices each device adapted to communicate with the content acquisition interface of a mobile terminal located proximate the content providing device and enable acquisition of a content data stream by the mobile device.

18. A system as claimed in claim 17, wherein the content providing device signals to the mobile terminal to offer the content data in response to a discovery signal from the mobile terminal enabling the acquisition of the content data by the mobile terminal in response to a single user action.

19. A system as claimed in claim 18, wherein the single user action is pressing one button.

20. A system as claimed in claim 16 the system further comprising:
one or more content providers.

21. A non-transitory computer readable memory storing medium carrying computer readable instructions which, when executed by a computer, perform a method for displaying content on a display of a mobile terminal, the method comprising the steps of enabling, by a content acquisition interface, a mobile terminal to acquire content data from one or more content providers;
controlling automatically, by a graphic display player adapted to fully occupy the whole of the display area of the display, displaying content data in a scrolling mode and providing a graphical user interface of control features and displaying the graphical user interface concurrently with automatic display of content to enable a user to interact with the graphical user interface whilst viewing the content data to control one or more visual parameters of the way the content data will be displayed while the data is being displayed, the graphic display player having a formatting component adapted to format the acquired content data according to a predetermined parameter based on display limitations for the mobile terminal, and on a chosen visual parameter value wherein the content formatting comprises dividing the content data into a sequence of consecutive segments such that any portion of content data that is capable of being displayed by the display is divided into one or more displayable segments based on the predetermined parameters and any portion of content data stream that is not capable of being displayed is designated as an undisplayable segment in the sequence, such that the displayable segments can be displayed by the display consecutively; and
displaying, by a display component, the formatted content on the display, wherein a value of the one or more visual parameters can be accessed and modified during concurrent displaying of the content data using the graphical user interface to enable the content data to be dynamically formatted and displayed according to the modified value of the chosen visual parameter.

* * * * *